US010613933B2

(12) United States Patent
Bennett, Jr. et al.

(10) Patent No.: US 10,613,933 B2
(45) Date of Patent: Apr. 7, 2020

(54) SYSTEM AND METHOD FOR PROVIDING THIN-PROVISIONED BLOCK STORAGE WITH MULTIPLE DATA PROTECTION CLASSES

(71) Applicant: Hitachi Vantara Corporation, Santa Clara, CA (US)

(72) Inventors: Charles C. Bennett, Jr., Carlisle, MA (US); Nathan W. Clark, Millbury, MA (US); Kevin Canuette Grimaldi, Austin, TX (US)

(73) Assignee: Hitachi Vantara LLC, Santa Clara, CA (US)

( * ) Notice: Subject to any disclaimer, the term of this patent is extended or adjusted under 35 U.S.C. 154(b) by 659 days.

(21) Appl. No.: 15/308,907

(22) PCT Filed: Dec. 9, 2014

(86) PCT No.: PCT/US2014/069206
§ 371 (c)(1),
(2) Date: Nov. 4, 2016

(87) PCT Pub. No.: WO2016/093797
PCT Pub. Date: Jun. 16, 2016

(65) Prior Publication Data
US 2017/0075761 A1 Mar. 16, 2017

(51) Int. Cl.
*G06F 11/10* (2006.01)
*G06F 3/06* (2006.01)
(Continued)

(52) U.S. Cl.
CPC .......... *G06F 11/1076* (2013.01); *G06F 3/064* (2013.01); *G06F 3/0619* (2013.01);
(Continued)

(58) Field of Classification Search
None
See application file for complete search history.

(56) References Cited

U.S. PATENT DOCUMENTS 5,515,502 A 5/1996 Wood
7,949,847 B2 5/2011 Murase
(Continued)

OTHER PUBLICATIONS

Extended European Search Report received in corresponding European Application No. 14907660.6 dated Jun. 26, 2018.
(Continued)

*Primary Examiner* — Justin R Knapp
(74) *Attorney, Agent, or Firm* — Mattingly & Malur, PC

(57) ABSTRACT

In some examples, a multi-node system may access physical storage divided into extents and further arranged into extent groups that may be allocated on demand as thin provisioned storage in response to write requests. Protection class instances are set with specified data protection capabilities. Each instance acts as a logical unit having a distinct addressable block storage space from the extent groups allocated thereto. The extents in an extent group to be allocated to a given protection class instance may vary depending on the protection class capabilities. Management information for the extents, extent groups, and protection classes may be stored in mirrored devices separate from the write data stored in the extents for providing redundant protection to the management information and for increasing the availability of write data in the event of a failure that may cause data loss at one or more locations in the system.

19 Claims, 22 Drawing Sheets

(51) Int. Cl.
  *G06F 11/00* (2006.01)
  *G06F 11/20* (2006.01)
  *G06F 11/07* (2006.01)

(52) U.S. Cl.
  CPC .......... *G06F 3/0631* (2013.01); *G06F 3/0689* (2013.01); *G06F 11/0727* (2013.01); *G06F 11/1048* (2013.01); *G06F 11/2069* (2013.01); *G06F 11/2094* (2013.01); *G06F 2201/805* (2013.01)

(56) References Cited

U.S. PATENT DOCUMENTS

| | | | |
|---|---|---|---|
| 8,185,551 B2 | 5/2012 | Kuszmaul et al. | |
| 8,402,346 B2 | 3/2013 | Goel et al. | |
| 8,850,130 B1 | 9/2014 | Aron et al. | |
| 8,996,563 B2 | 3/2015 | Bender et al. | |
| 2005/0279837 A1 | 12/2005 | Hajji | |
| 2006/0047957 A1* | 3/2006 | Helms | G06F 21/10 |
| | | | 713/165 |
| 2007/0055909 A1 | 3/2007 | Smith et al. | |
| 2007/0168396 A1 | 7/2007 | Adams et al. | |
| 2007/0260842 A1 | 11/2007 | Faibish et al. | |
| 2008/0005612 A1 | 1/2008 | Arai | |
| 2009/0144598 A1 | 6/2009 | Yoon et al. | |
| 2011/0082997 A1 | 4/2011 | Yochai et al. | |
| 2012/0084506 A1 | 4/2012 | Colgrove et al. | |
| 2012/0198152 A1 | 8/2012 | Terry et al. | |
| 2013/0205070 A1 | 8/2013 | Koseki et al. | |
| 2013/0238851 A1 | 9/2013 | Chang et al. | |
| 2014/0068182 A1 | 3/2014 | Terry | |
| 2014/0195492 A1 | 7/2014 | Wilding | |
| 2016/0110111 A1* | 4/2016 | Song | G06F 3/0607 |
| | | | 711/103 |
| 2017/0075781 A1* | 3/2017 | Bennett, Jr. | G06F 3/0619 |

OTHER PUBLICATIONS

Erik Ponds, "Drobo Technology Innovation", Drobo, Inc., Jul. 2011, p. 1-32.
International Search Report of PCT/US2014/069206 dated Mar. 2, 2015.

* cited by examiner

SYSTEM AND METHOD FOR PROVIDING THIN-PROVISIONED BLOCK STORAGE WITH MULTIPLE DATA PROTECTION CLASSES

TECHNICAL FIELD

This disclosure relates in general to the technical field of storage systems, such as a storage environment that that provides block access to storage media to provide block storage.

BACKGROUND

In conventional storage systems, RAID (redundant array of individual disks) based data protection can be provided by individual RAID groups. However, actual physical disks must be present and selected to act as a RAID group before the corresponding storage space can be made available for use. When a disk fails in a conventional RAID system, the failed disks must be quickly replaced, either by using a hot spare or by manually replacing the failed disk. Once the failed disk is swapped with a replacement disk, a period of high frequency I/O is directed to the replacement disk to reconstruct the data stored thereon in order to provide ongoing data protection. Namely, the RAID group enters a degraded state until the missing data from the failed disk is reconstructed on the replacement disk. During the updating period of the replacement disk, the RAID group is vulnerable to subsequent disk failures.

Another problem also exists in conventional storage systems which rely on RAID based data protection. In the event of power failure, partially written RAID stripes cannot be recovered. In general, to overcome this problem, uninterruptible power supplies have been provided or memory areas having battery backup protection have been provided.

In addition, conventional RAID based storage systems are inflexible since all disks in a RAID group are dedicated to a single level of protection regardless of the storage utilization, or lack thereof, in the disks. Formatting a RAID group is time consuming process that can further contribute to the delay of utilizing the storage space therein. While providing a hot spare can provide a ready replacement disk, such configurations require that one or more disks in the storage system remain idle and unused until a failure occurs. On the other hand, if no hot spare is provided, careful attention must be paid to the RAID group to ensure that when a failure does occur, that prompt replacement of the failed disk occurs.

When in the process of recovering a failed disk by restoring data to the replacement disk, all writes are directed to the replacement disk in order to restore the protection level of the particular RAID group. As explained above, during this time, the RAID group is susceptible to additional disk failures and the time until the protection level of the RAID group is restored is generally limited by the bandwidth of the head assembly which writes to the replacement disk.

SUMMARY

This disclosure includes techniques and arrangements for a multi-node system that is able to access a physical storage divided into extents. As one example, the storage may be arranged into extent groups that are allocated on demand as thin provisioned storage in response to write requests.

According to some implementations, a storage system has a plurality of storage devices or disks which comprise the underlying physical storage areas for the storage system. Each of the storage devices is divided into units referred to herein as "extents". Extents are further arranged into extent groups, of one or more extents, which can be allocated on demand to protection classes as thin provisioned storage. One or more protection class instances are configured on the storage system and each protection class providing different protection algorithms and data protection capabilities. Further, each protection class instance provides a unique or otherwise individually distinguishable addressable block space from the extent groups allocated thereto. As such, the number of extents which are arranged into an extent group to be allocated to a given protection class instance may vary depending the specifics of the protection class itself. While the storage devices are divided into and managed as extents, the management information for the extents, extent groups, and protection classes may be stored in mirrored devices separate from the write data for providing redundant protection to the management information.

When a write is received by the storage system, it is determined which protection class instance the write is directed. Next, it is determined whether one or more of the extent groups previously allocated to the protection class instance has capacity in the extents thereof to store the write data. If additional capacity is needed, a new extent group is created from the extents offered by the plurality of storage devices, and the new extent group is allocated to the protection class to store the write data. The number of extents in the new extent group and their location among the plurality of storage devices depends on the data protection characteristics of the protection class instance itself. Thus, each extent group for a particular protection class may include the same number of extents in accordance with the data protection characteristics thereof.

In some implementations, each storage device contains a portion of the management information of the extents which are provided thereon. Further, the management information for the extents, extent groups, and protection classes which exist for all storage devices is aggregated and stored separately from the storage devices which provide the extents themselves. When failures or events cause the management information to become unavailable or inaccessible, the aggregated management information can be recovered by referring to the storage devices individually. Namely, management information of the mirrored devices can be reconstructed by referring to header information stored for each extent configured on each of the plurality of storage devices. Within the header information for each extent, identifiers of an extent group, a protection class instance and a logical location within the respective extent group are stored.

Further, in some implementations, when one or more storage devices experience failures or events causing information and/or data thereon to become unavailable or inaccessible, it is possible to repair each of the extent groups having an extent provided by a failed storage device. Further, a priority order is established to repair the extent groups affected by the storage device failures based on the data protection characteristics of the protection class instances to which the extent groups belong and the operational status of the underlying storage devices themselves. According to the priority order to repair the extent groups, each extent which was provided by a failed storage device can be repaired and stored on another storage device by referring to the protection information in the extent groups to which each of the extents configured on the one or more of the failed storage devices are mapped in the extent group information.

Still further, in some implementations, when a write is received by the storage system, a journal entry of the write may be stored in order to recover from a failure which interrupts the write. A journal entry containing parity or other protection information is created for a predetermined unit of write data to an extent based on the data to be written to the stripe, existing data in the stripe and protection information of the existing data in the stripe. The journal entry does not include the data to be written to the stripe itself but rather contains protection information of existing data which is not modified by the data to be written. Thus, if a write fails to complete, the existing data which is not modified can be guaranteed to be accurate while also allowing for the data which was to be written to be recomputed from the available protection information and the write completed where possible. Further, the journal entries are stored across the storage devices in such a way that in the event of storage device failure it is still possible to recover individual journal entries since each journal entry contains protection information of existing data which is not modified by the data to be written. In other implementations journal entries may be calculated for entire extents rather than per stripe.

Accordingly, thin-provisioned block storage for multiple protection classes having individually distinguishable addressable block space from extent groups allocated thereto is realized which further provides specific levels of data protection, recovery of the extents storing block data, recovery of the extent management information, journaling of write operations in such a manner that the journal entries contain parity or protection information rather than the write data itself, and recovery of the journal entries using the parity or protection information.

BRIEF DESCRIPTION OF THE DRAWINGS

The detailed description is set forth with reference to the accompanying figures. In the figures, the use of the same reference numbers in different figures indicates similar or identical items or features.

DETAILED DESCRIPTION

In an example storage system according to some implementations, a plurality of storage devices or disks comprise the underlying physical storage for the storage system. Each of the storage devices is divided into units referred to herein as "extents". Each of the extents is subdivided into a plurality of blocks, which are the smallest storage units of the storage system. The blocks individually store data or protection information. Further, the extents are arranged into extent groups, of one or more extents, which can be allocated on demand to protection classes as thin provisioned storage. One or more protection class instances are configured on the storage system by an administrator of the storage system and each protection class provides different protection algorithms and data protection capabilities for the data stored in the blocks of the extents of the allocated extent groups. The data stored in the extents may be protected using parity, Reed Solomon erasure coding, RAID levels, mirroring or other error detection coding techniques. Further, each protection class instance provides a unique, distinct, or otherwise individually distinguishable addressable block space from the extent groups allocated thereto so that each protection class instance can be treated as a logical unit by the clients.

The number of extents which are arranged into an extent group to be allocated to a given protection class instance may vary depending the specifics of the protection class itself. While the storage devices are divided into and managed as extents, the management information for the extents, extent groups, and protection classes may be stored in a relational database on mirrored devices separate from the devices which store write data, protection information, and journal information for providing redundant protection to the extent management information.

Figure 1:
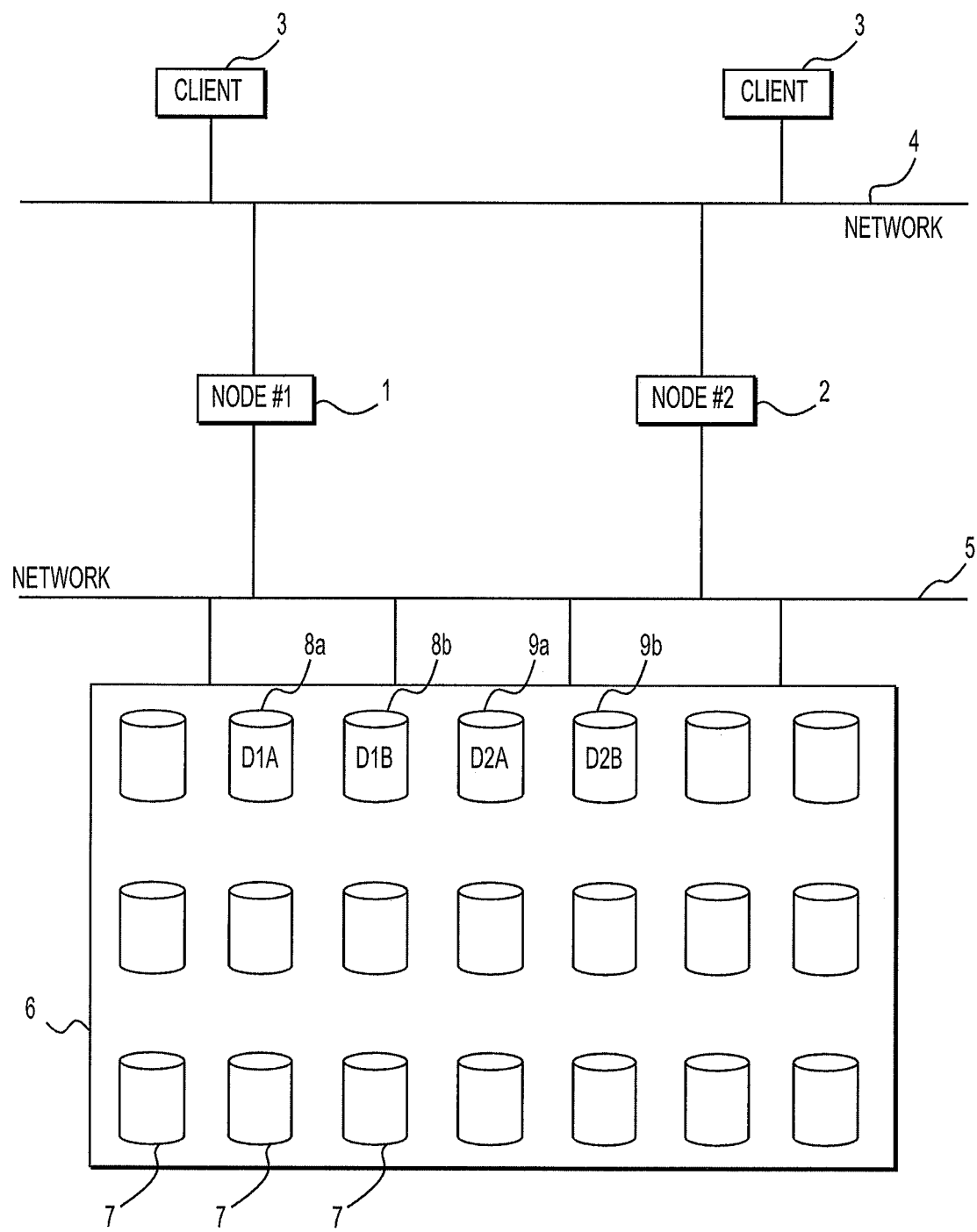
FIG. 1 is a schematic diagram of an illustrative environment for implementing the methods and systems for thin provisioned block storage according to the some implementations described herein.

FIG. 1 is a schematic diagram of an illustrative environment for implementing the methods and systems for thin provisioned block storage according to some implementations. In FIG. 1, one or more clients 3 are connected through a network 4 with a pair of nodes 1, 2, which provide block storage to the clients as will be discussed in further detail below. Further, the nodes 1, 2 are connected through another network 5 with a shared storage pool 6 of physical storage devices 7 (e.g., disks). Within the pool 6, storage devices 8A, 8B are reserved to store management information for node 1 and storage devices 9A, 9B are reserved to store management information for node 2 as will be discussed in further detail below. The network 5 may be a storage fabric such as an SAS fabric to facilitate data communication from the nodes 1, 2 and the storage pool 6.

While FIG. 1 shows a pair of nodes 1, 2, implementations herein are not limited in this sense and there may be any number of nodes provided between the clients 3 and the storage pool 6. In the illustrated example, both of nodes 1, 2 are "operational" ("active") nodes which operate according to the processing described herein. Moreover, if one of the nodes 1, 2 experiences a failure, the other of the nodes takes over operations of the failed node and continues processing so that the storage system remains operational. However, there may be any number of nodes and a two node system is described here for simplicity only.

Moreover, within the pool 6, the storage devices 8A, 8B may be configured as a mirrored pair to duplicate an extent information database 11F for node 1, and storage devices 9A, 9B may be configured as a mirrored pair to duplicate an extent information database 11F for node 2. Namely, the storage devices 8A, 8B and 9A, 9B are each a RAID1 pair to provide redundancy against the failure of one the paired drives and to ensure that each of the nodes 1, 2 can access the extent information stored therein to continue to manage the extents across storage devices 7. The remainder of the storage devices 7 in the storage pool 6 are configured to store data from the clients 3 and are managed by the nodes 1, 2. While mirrored pairs of devices 8A, 8B and 9A, 9B are not necessary to practicing all aspects, in some examples, the mirrored pairs may protect against loss of the extent information database 11F from the system memory 11 of one or more nodes due to a crash of the nodes themselves. Further, as explained in FIGS. 12-13, when the extent information database 11F is lost to node failure and the devices 8A, 8B and 9A, 9B suffer failures causing the extent information database 11F to become inaccessible as a whole, it is possible to recover the extent information database 11F by referring to the header information stored on each storage device as shown on FIG. 4.

Figure 2:
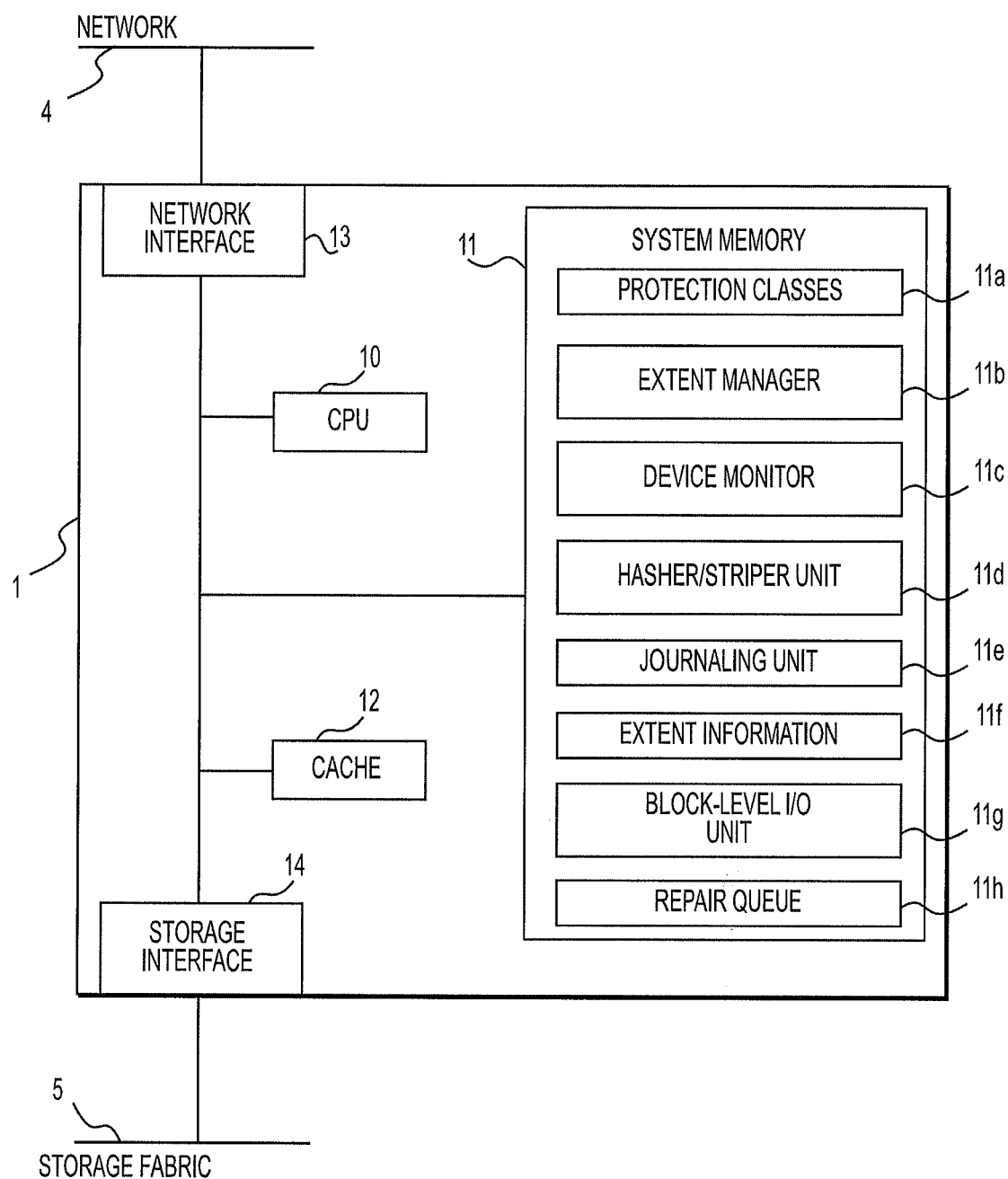
FIG. 2 is a block diagram of a hardware and software components in an example configuration for one of the nodes shown in FIG. 1 according to some embodiments.

FIG. 2 is a block diagram of hardware and software components in an example configuration for one of the nodes shown in FIG. 1. For example, node 1 includes one or more processors (e.g., a central processing unit (CPU)) 10, a cache memory area 12, a system memory 11, a network interface 13 to communicate with the clients 3 over the network 4, and a second interface 14, such as a storage interface (SAS interface, FC interface, iSCSI interface), to communicate with the storage pool 6 over the network 5 (e.g., a storage fabric (SAS fabric, FC fabric, iSCSI fabric)). However, the implementations herein are not limited as to any particular protocol.

The system memory 11 stores executable instructions which are executable by the CPU 10 to provide protection class management information 11A, an extent manager 11B, a hasher/striper 11D, a journaling unit 11E, extent information database 11F, a block-level I/O unit 11G. While each node 1, 2, may store the extent information database 11F in the system memory 11 thereof, in order to protect against when a node experiences a failure causing the loss of the extent information database 11F, the storage devices 8A, 8B, 9A and 9B are provided in the storage pool to advantageously provide synchronized copies of the extent information 11F which the nodes 1, 2 can refer to when recovering from operation failure. Accordingly, the extent information 11F in the system memory 11 may be periodically updated or synchronized with the copies stored in the storage devices 8A, 8B, 9A and 9B. Thus, in some implementations described herein, while the extent information database 11F is referred to generally, copies of the data contained therein may be stored in both nodes as well as the storage pool 6.

Figure 3:
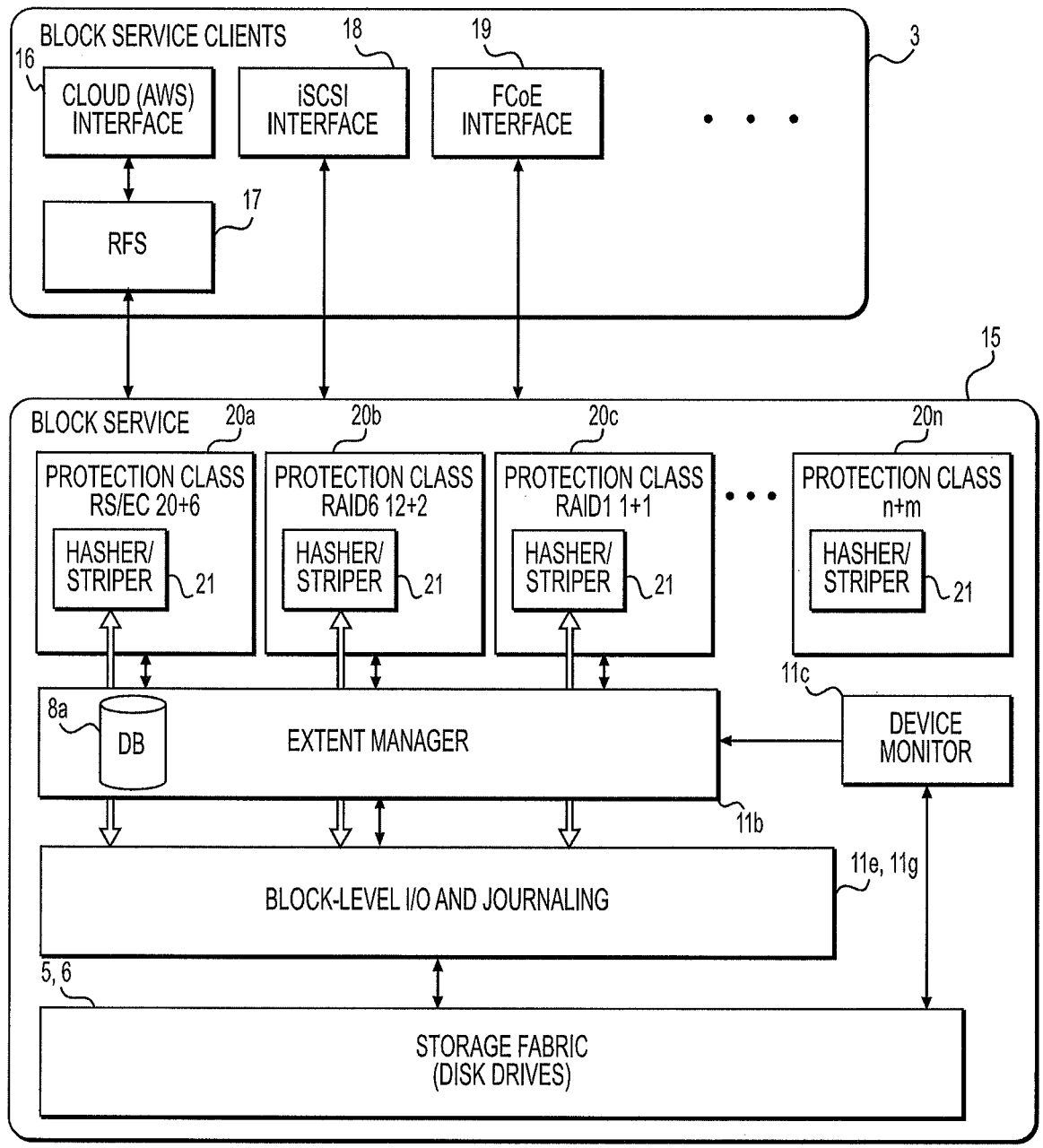
FIG. 3 is a logical diagram of the illustrative software environment showing data transaction paths between various components according to some embodiments.

FIG. 3 is a logical diagram of the illustrative software environment showing data transaction paths between various components according to some implementations. The nodes 1, 2 and storage pool 6 provide a block storage service 15 to the clients 3. The block storage service 15 is accessible by any number of interfaces and FIG. 3 shows that the clients 3 may use a cloud (Amazon Web Services (AWS)) interface 16 and a RFS interface 17 (remote file sharing), an iSCSI interface 18, and/or a FCoE interface 19 to access the block storage service 15.

One or more protection class instances 20A, 20B, 20C to 20N are provided by the block storage service 15 to the clients. For example, protection class 20A provides Reed-Solomon Erasure Coding (RS/EC) data protection. Protection class 20B provides RAID6 data protection and protection class 20C provides RAID1 data protection. Accordingly, each protection class 20N provides a specified level of data protection for the data stored therein and is denoted herein using the notation "A+B" where 'A' refers to the number of extents storing client-accessible data and 'B' refers to the number of extents storing protection data for the client accessible data within the extent groups of the protection class instance. Thus, in protection class instance 20A, RS/EC is implemented on extent groups having 20 extents of data and 6 extents of protection per extent group so that the 6 protection extents store protection data calculated according to RS/EC. Similarly, in a RAID-based protection class, for each extent group thereof, the protection extents store parity data calculated from the corresponding data extents of the extent group. In still other implementations, mirroring or other error detection coding techniques may be used, separately or in combination with the above protection techniques, to provide data protection. While protection information, protection data, parity information and parity data may be the terms used herein to describe the stored content on the protection extents, the particular algorithms used to calculate the protection information are administratively set for each protection class.

Each protection class provides an addressable block storage space for client data which has a predefined level of data protection from the extents which are allocated thereto. The addressable block storage space may be unique or otherwise individually distinguishable with respect to other addressable block storage spaces of other protections classes. In this configuration, each protection class is accessible by the clients as a logical unit having a unique, or otherwise distinct, block address space thereon and can be identified, for instance, by a logical unit number (LUN) when reading and writing thereto. Accordingly, each of the clients may access one or more of protection classes depending on whether the clients have the authority to access the content thereof. In general, client access to a particular protection class instance may be administratively set when defining the protection class instance.

Each of the protection class instances is provided with a hasher/striper service 21 by the hasher/striper unit 11D. The extent manager 11B serves as an intermediary between the protection classes and block-level I/O and journaling units 11E, 11G. Further, the extent manager utilizes the extent management information in the relational database DB stored on storage device 8a, for example, to manage extents and extent groups as well as the creation and allocation thereof. In other words, the storage devices provide quick access to the extent information database 11F which aggregates the data present in the superblocks 22 of the storage devices 7. The block-level I/O and journaling units 11E, 11G communicate with the physical storage devices 7 of the storage pool 6 to store the data of the protection classes 20N therein as explained in greater detail below. Additionally, a device monitor 11C is provided to monitor the status of the storage devices in the pool 6 to determine when any of the devices in the storage pool 6 have failed. In addition, a heartbeat monitoring function may also be provided separately in the system memory 11 or included in the device monitor 110 to determine when a failure has occurred in the other nodes.

Figure 4:
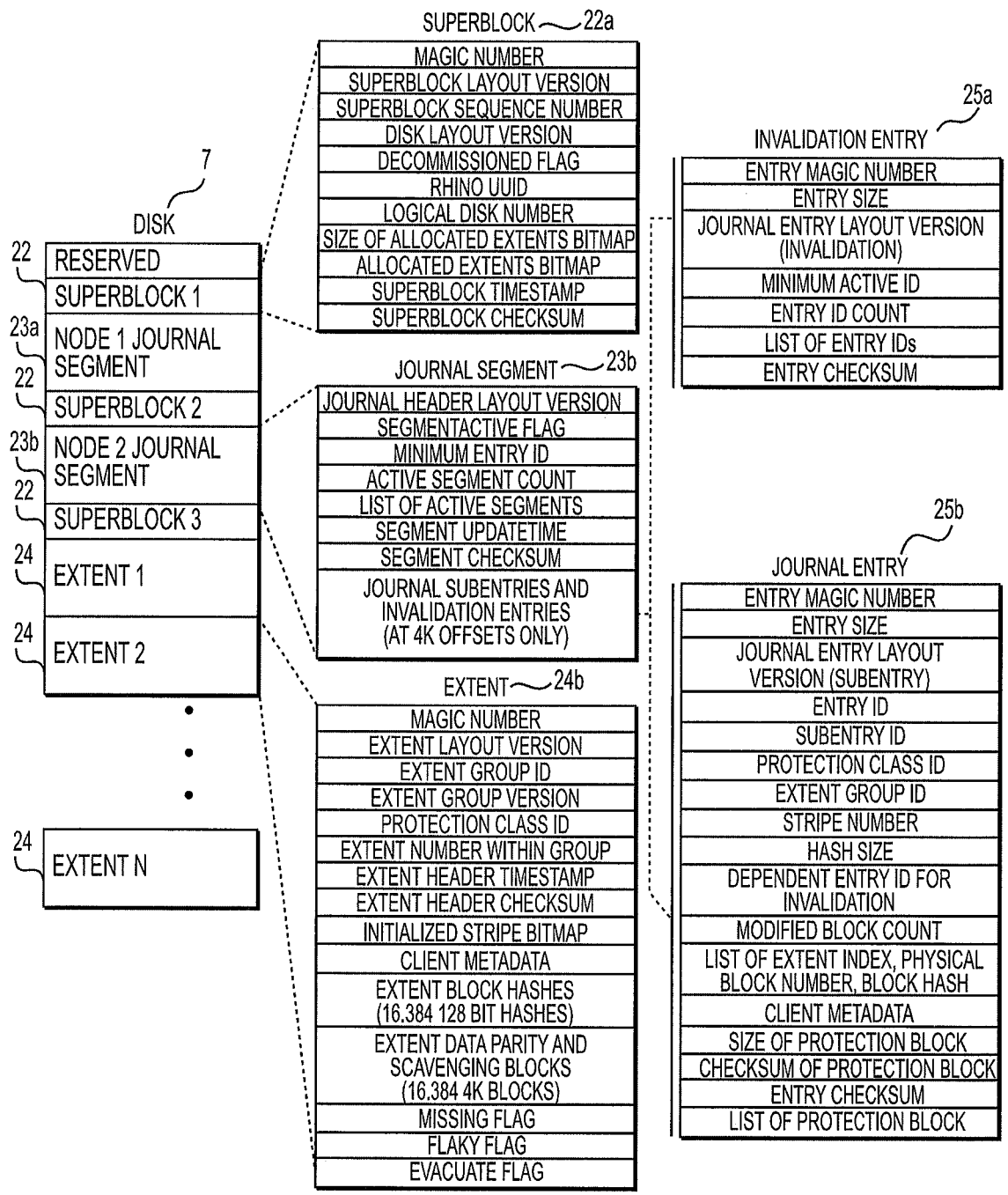
FIG. 4 is a diagram showing a disk and the data structures stored thereon.

FIG. 4 is a diagram showing a disk and the detailed data structures stored thereon. A disk (e.g., one of the storage devices 7) is arranged to store data as shown in the abstract representation of FIG. 4. A superblock 22 (e.g., superblock 1) stores disk management information including a UUID, logical disk number and bitmap of allocated extents. Additional superblocks 22 (e.g., superblocks 2 and 3) are also arranged on the disk. Superblocks 2 and 3 store the same information as superblock 1. Thus, the superblocks 22 on a given storage device 7 redundantly store the same information.

Further, a node 1 journal segment 23A and a node 2 journal segment 23B are arranged to facilitate journaling of write data. Each segment 23 includes journal subentries 25B and invalidation entries 25A as well as active segment count and a list of active segments. The active segment count is the number of storage devices which store journal segments 23 which relate to active writes. The list of active segments is a list of the logical disk number, or other identification, of each storage device included in the active segment count.

While FIG. 4 shows that each storage device includes two journal segments 23A, 23B, the particular number of journal segments 23 corresponds to the number of nodes implemented in the storage system (e.g., three nodes and three separate journal segments 23). An invalidation entry 25A includes an entry magic number, entry size, a journal entry layout version (e.g., invalidation information), a minimum active ID, an entry ID count, a list of entry IDs and an entry checksum. A journal subentry 25B includes an entry ID, a protection class ID, an extent group ID, a stripe number, a list of extent index, physical block numbers, and a block hash, a size of protection blocks, a checksum of the protection blocks, an entry checksum, and a list of protection blocks. A journal subentry 25B is designated as inactive for purposes of journal replay by the presence of a corresponding invalidation entry 25A in the journal segment 23 thereof.

Following the third superblock 22C, the disk 7 is divided into a plurality of extents 24 (e.g., extents 1, 2 to N). Within each of the extents 24, there is an extent header where extent information is stored that describes the individual extent. The extent header has a fixed size and may include an extent group ID to indicate which extent group the extent belongs, an extent group version which is updated when an extent is added or lost from the extent group, a protection class ID, an extent number within the extent group (e.g., the sequential placement of the extent within the extent group identified by the extent group ID), a timestamp, a checksum, and hashes of the extent blocks. For example, each extent may be provided as a 64 MB storage unit, which is then sub-divided into individual blocks which are in turn provided as 4 KB storage units. A block is the smallest storage unit defined. Thus, when writing or reading to a protection class, a block address and offset may be specified from the client.

In the case that extents are 64 MB in size, each 64 MB extent may in turn provide 16,384 individual blocks which are each 4 KB in size with a corresponding 16,384 128-bit hashes stored in the extent header. In such a configuration, the extent header has a size of 264 KB. While FIG. 4 shows management information stored in the superblocks as well as individual extent information stored in each extent across each storage device 7, the management information and the extent information other than the actual data therein is also aggregated into the extent information database 11F. By aggregating the management information shown in FIG. 4 of each storage device 7 into the extent information database 11F in the system memory 11, the bandwidth necessary to retrieve the management information from each storage device can be minimized while optimally providing the management information in each node. Thus, the extent information database 11F is not only redundantly stored in the system memory 11 and the storage devices 8A, 8B, 9A, 9B but is also distributed across the devices in the storage pool 6 as shown in FIG. 4.

In general, the extent information database 11F may be divided according to each protection class instance and may include the mapping of each extent to the storage pool. Specifically, for each protection class managed in the extent information database 11F, each extent allocated as part of an extent group may be managed in association with a logical disk number, an extent group ID, an extent group version, and an extent number within the extent group. As a result, the extent information database 11F is protected against catastrophic failure of the nodes and the storage devices 8A, 8B, 9A, 9B as additionally below with reference to FIGS. 12-13. Further, in each extent header, a missing flag indicates that the extent is currently missing and cannot be found where it is expected to be located as recorded in the extent information database 11F. This may be due, for example, to the storage device failing or to the failure in the connectivity between the storage device and the nodes 1, 2. An "evacuate" flag indicates that the extent should be moved to another storage device. Further, a "flaky" flag indicates that the storage device storing the extent is experiencing intermittent I/O errors and the data of the extent might only be read during extent group repair procedures as a last resort. For example, the device monitor 110 may set the flags for each extent according to the statuses of each of the storage devices 7 in the storage pool 6.

The following descriptions may generally refer to the disks as having extents which store data or protection information while omitting the superblocks, journal segments and management information shown in FIG. 4 for simplicity. However, in this embodiment, each of the storage devices 7 is configured like the disk as shown in FIG. 4 to provide superblocks, journal segments and equally, sized extents thereon.

Figure 5:
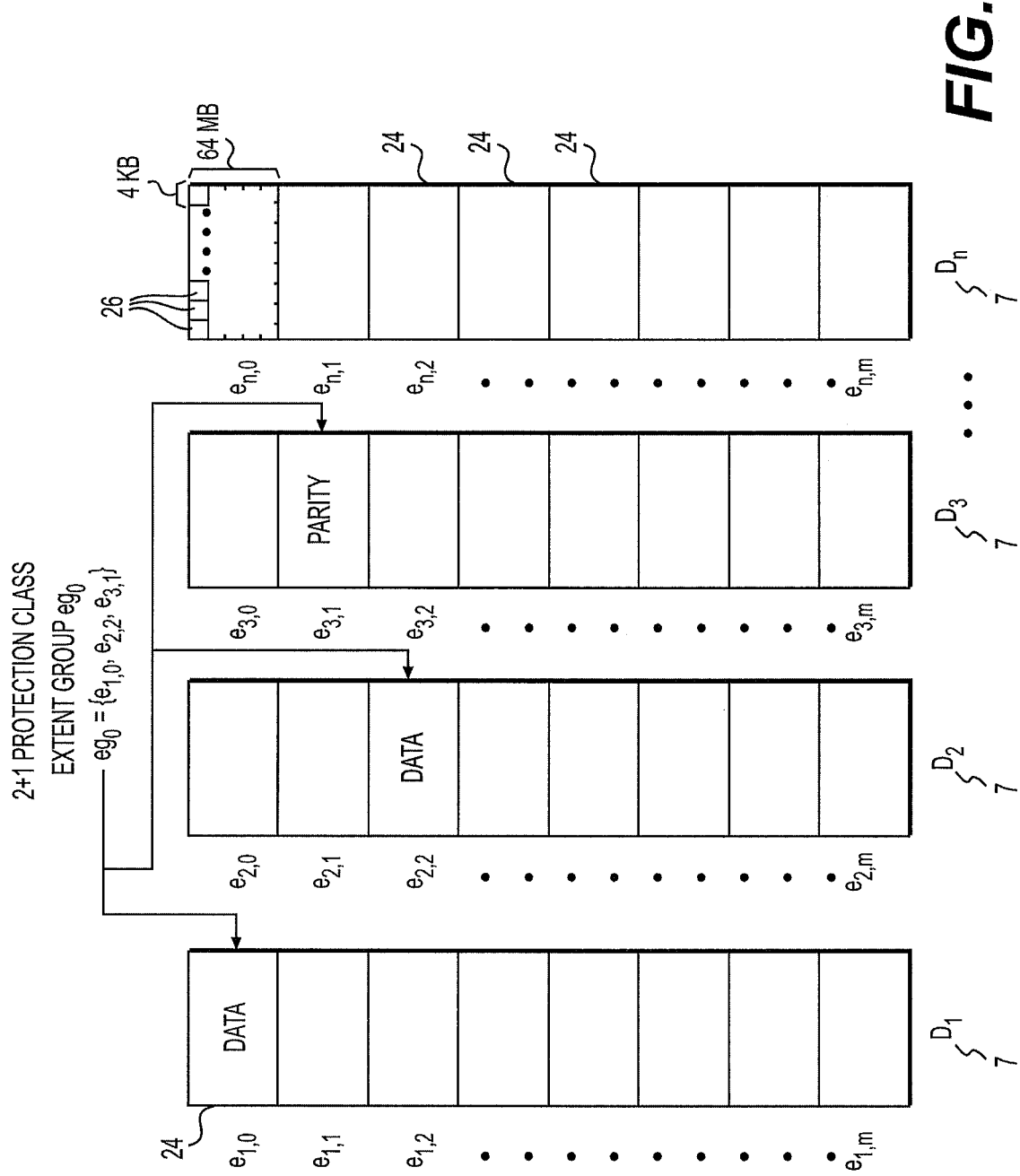
FIG. 5 is a diagram showing an example extent group of a 2+1 data protection class according to some implementations.
Figure 6:
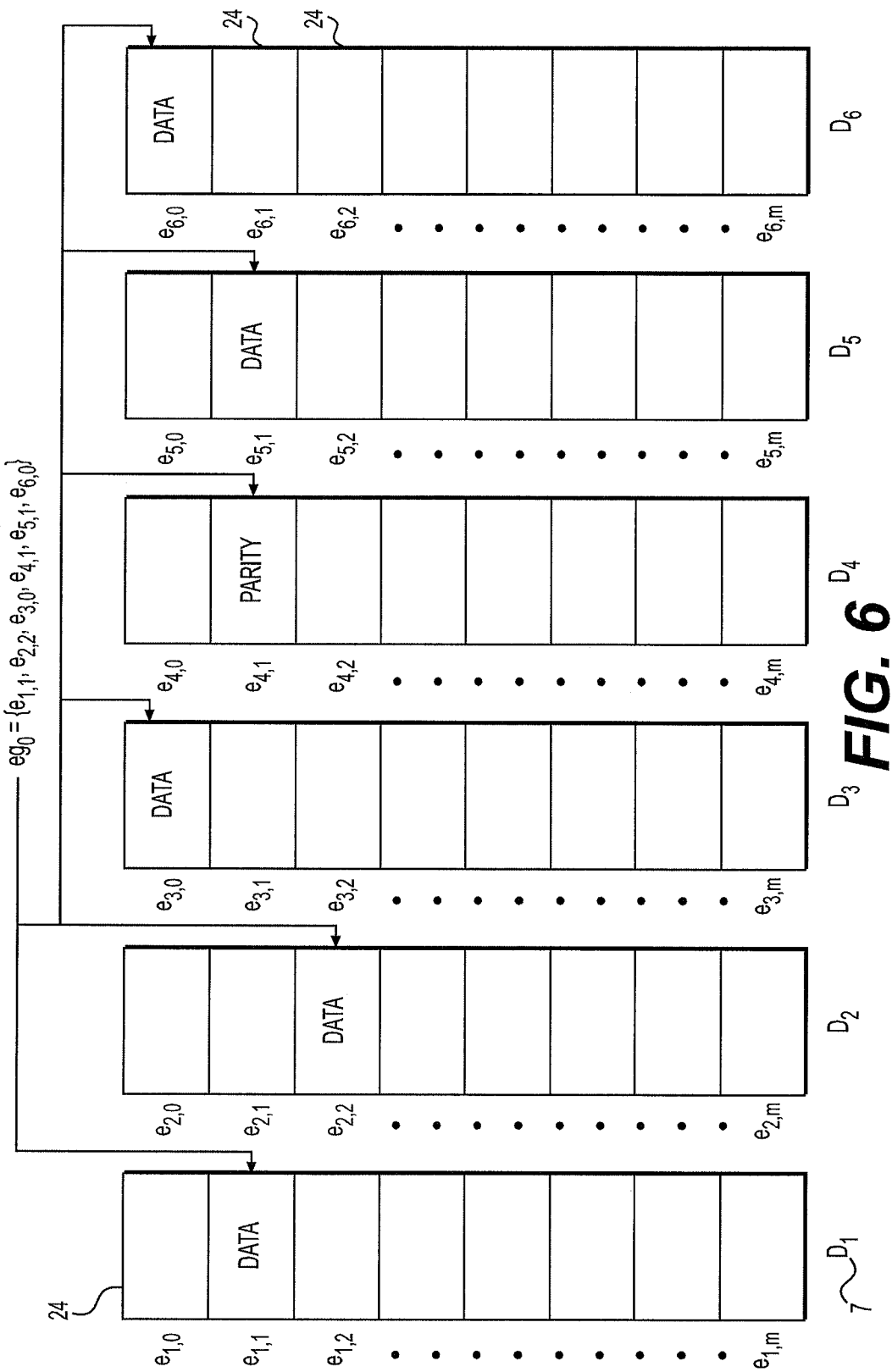
FIG. 6 is a diagram showing an example extent group with RAID5 5+1 data protection class according to some implementations.
Figure 7:
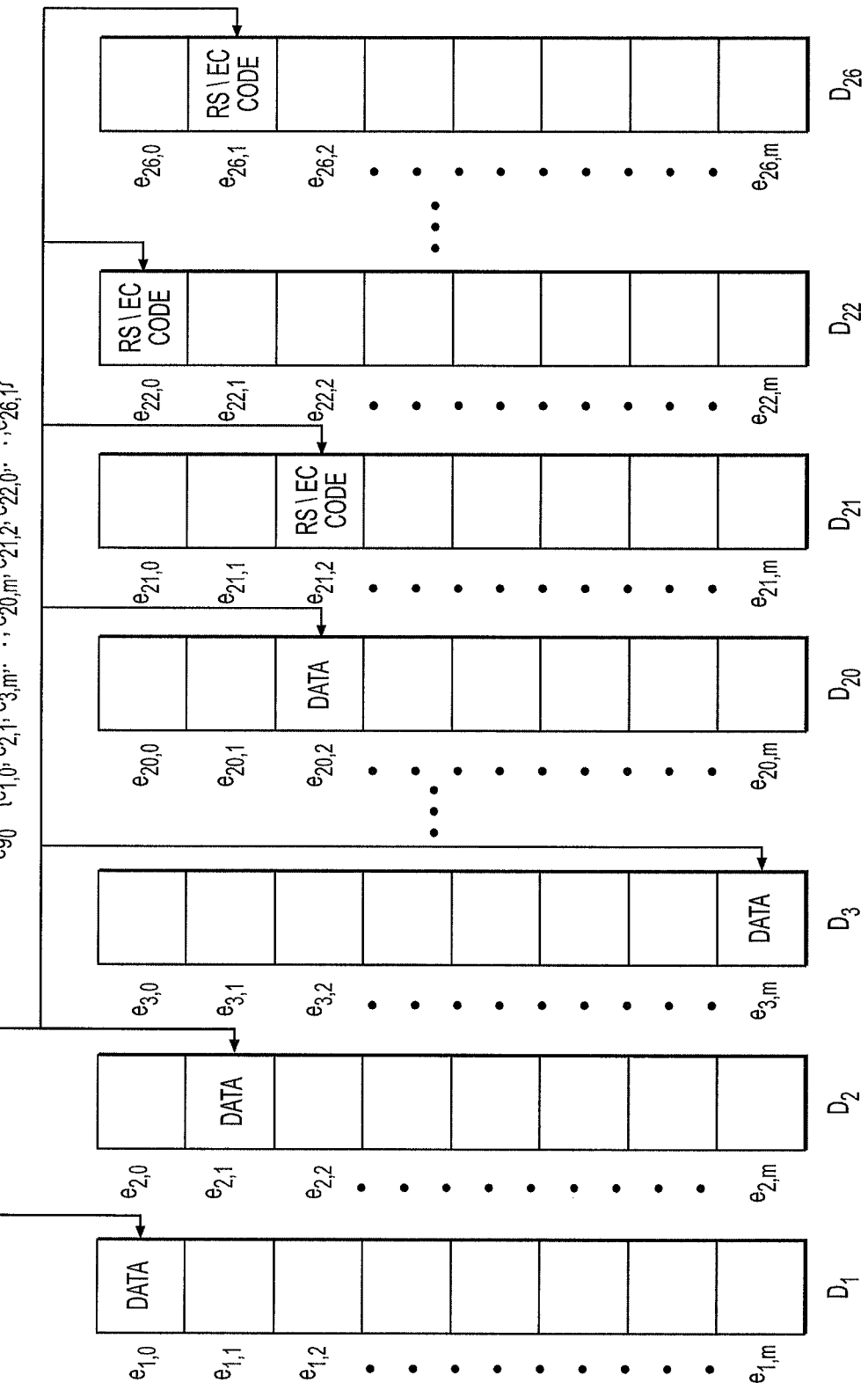
FIG. 7 is a diagram showing an example extent group with RS/EC 20+6 data protection class according to some implementations.

For simplicity, FIGS. 5-7 only show the extents which are arranged on each of the disks. In each of FIGS. 5-7, each extent is arranged on an individual storage device 7 separately from other extents of the same extent group. Accordingly, within each extent group, the extents are spread across the maximum number of storage devices to provide protection against failure of any of the storage devices. Thus, when any one storage devices fails, for a single extent group, only one extent may be inaccessible or missing within the single extent group. While in some examples, no storage device provides more than one extent to any one extent group, such a configuration is not a limiting requirement.

FIG. 5 is a diagram showing an example extent group of a 2+1 data protection class according to some implementations. FIG. 5 shows a plurality of storage devices 7 which include disks $D_1$, $D_2$, $D_3$ to $D_n$. Each of the disks as shown in FIG. 4 is divided into a plurality of extents 24. Further, each extent is sub-divided into blocks 26. According to the 2+1 protection class, as in FIG. 5, a single extent group $eg_0$ when allocated to an instance of the 2+1 protection class includes three extents. Two of the extents are to store client data and the third extent stores protection information for the two data extents such as parity information for the client data in the two extents.

Disk $D_1$ is configured by the extent manager 11B to provide a plurality of extents denoted as $e_{1,0}$, $e_{1,1}$, $e_{2,1}$ to $e_{1,m}$ so that 'm' extents from $D_1$ are available to the extent manager 11B to be arranged into extent groups with extents from other disks. Disk $D_2$ is configured by the extent manager 11B to provide a plurality of extents denoted as $e_{2,0}$, $e_{2,1}$, $e_{2,2}$ to $e_{2,m}$ so that a second plurality of 'm' extents from $D_2$ are available to the extent manager 11B to be arranged into extent groups with extents from other disks. Disk $D_3$ is configured by the extent manager 11B to provide a plurality of extents denoted as $e_{3,0}$, $e_{3,1}$, $e_{3,1}$ to $e_{3,m}$ so that a third plurality of 'm' extents from $D_3$ are available to the extent manager 11B to be arranged into extent groups with extents from other disks. Thus, in general, an arbitrary disk $D_n$ is configured by the extent manager 11B to provide a plurality of extents denoted as $e_{n,0}$, $e_{n,1}$, $e_{n,1}$ to $e_{n,m}$ where 'n' denotes the logical disk number and 'm' denotes the number of extents provided thereon.

Accordingly, the extent group $eg_0$ for the 2+1 protection class can be defined as having three distinct extents $\{e_{1,0}, e_{2,2}, e_{3,1}\}$. The subscripts used to denote the individual extents do not represent the actual extent identification information, rather the subscript notation is merely for explanatory purposes. Data is stored in extents $e_{1,0}$, $e_{2,2}$, and protection information of $e_{1,0}$, $e_{2,2}$ is stored in $e_{3,1}$. For any extent group allocated to a 2+1 protection class, three extents are selected from three different storage devices 7 or disks in the storage pool 6. There is no requirement that the logical disk numbers be in sequence, instead the extents may be chosen by the extent manager 11B from any storage devices 7 which have one extent thereon which does not belong to any extent group, a so-called free or available extent. Thus, in general, for an "A+B" protection class, there must be a number of disks having at least one free extent which is equal to the sum of A+B so that no two extents in a single extent group reside on a single storage device 7.

FIG. 6 is a diagram showing an example extent group with RAID5 5+1 data protection class according to some implementations. As shown in FIG. 6, an extent group "$eg_0$" belonging to a "5+1" protection class requires six individual disks which each provide an extent therefrom to the extent group. The extent group $eg_0$ can therefore be defined as having six distinct extents $\{e_{1,1}, e_{2,2}, e_{3,0}, e_{4,1}, e_{5,1}, e_{6,0}\}$ where the extent 24 designated as $e_{4,1}$ stores the protection information of the extent group and is interleaved with the remaining data extents.

FIG. 7 is a diagram showing an example extent group with RS/EC 20+6 data protection class according to some implementations. As shown in FIG. 7, an extent group "$eg_0$" belonging to a RS/EC "20+6" protection class requires 26 individual disks which each provide an extent therefrom to the extent group. The extent group $eg_0$ can therefore be defined as having 26 distinct extents $\{e_{1,0}, e_{2,1}, e_{3,m}, \ldots, e_{20,2}, e_{21,2}, e_{22,0}, \ldots, e_{26,1}\}$ where the extents 24 designated as $e_{21,2}$, $e_{22,0}$ through $e_{26,1}$ store protection information for the data extents $e_{1,0}$, $e_{2,1}$, $e_{3,m}$, $\ldots$, $e_{20,2}$. While the protection extents and data extents are not shown as interleaved, the interleaving is omitted for the sake of simplicity. As such, the distribution of the data extents and protection extents may be interleaved similar to the arrangement shown in FIG. 6. To provide further redundancy and even greater protection, in some implementations, protection class instances may be mirrored within the storage pool 6.

Figure 8:
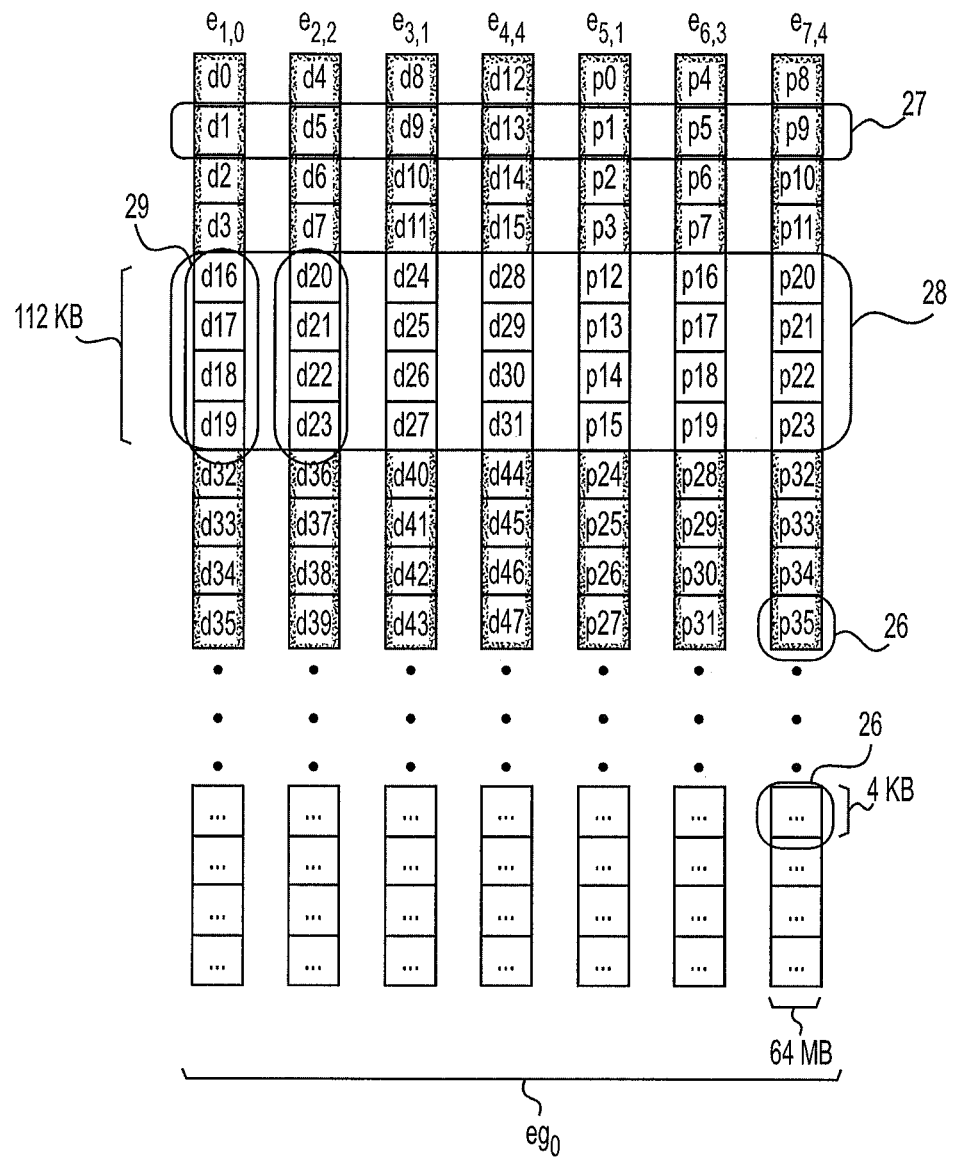
FIG. 8 is a diagram of block layout and data striping across extents.

FIG. 8 is a diagram of block layout and data striping across extents 24. An example extent group $eg_0$ is shown in FIG. 8 which belongs to a 4+3 protection class having 7 distinct extents $\{e_{1,0}, e_{2,2}, e_{3,1}, e_{4,4}, e_{5,1}, e_{6,3}, e_{7,4}\}$ selected from 7 individual disks. The extents are sub-divided into blocks, and data is written in blocks $d_0$ to $d_{47}$ in the extents $e_1$, $e_2$, $e_3$, $e_4$ while protection is written in blocks $p_0$ to $p_{35}$ in the extents $e_5$, $e_6$, $e_7$. The blocks 26 form the smallest addressable storage units in the extents. Blocks are combined for protection as a protection line 27. For example, one protection line in FIG. 8 is defined as $d_1$, $d_5$, $d_9$, $d_{13}$, $p_1$, $p_5$, $p_9$. Further, a stripe 28 is configured from 4 protection lines 27. Within a stripe 28, the blocks 26 which belong to one extent 24 form a strip 29. As shown in FIG. 8, one strip is formed from blocks $d_{20}$, $d_{21}$, $d_{22}$, $d_{23}$. When each block 26 is 4 KB in size, each strip 29 is 16 KB and each stripe 28 is 112 KB.

Figure 9:
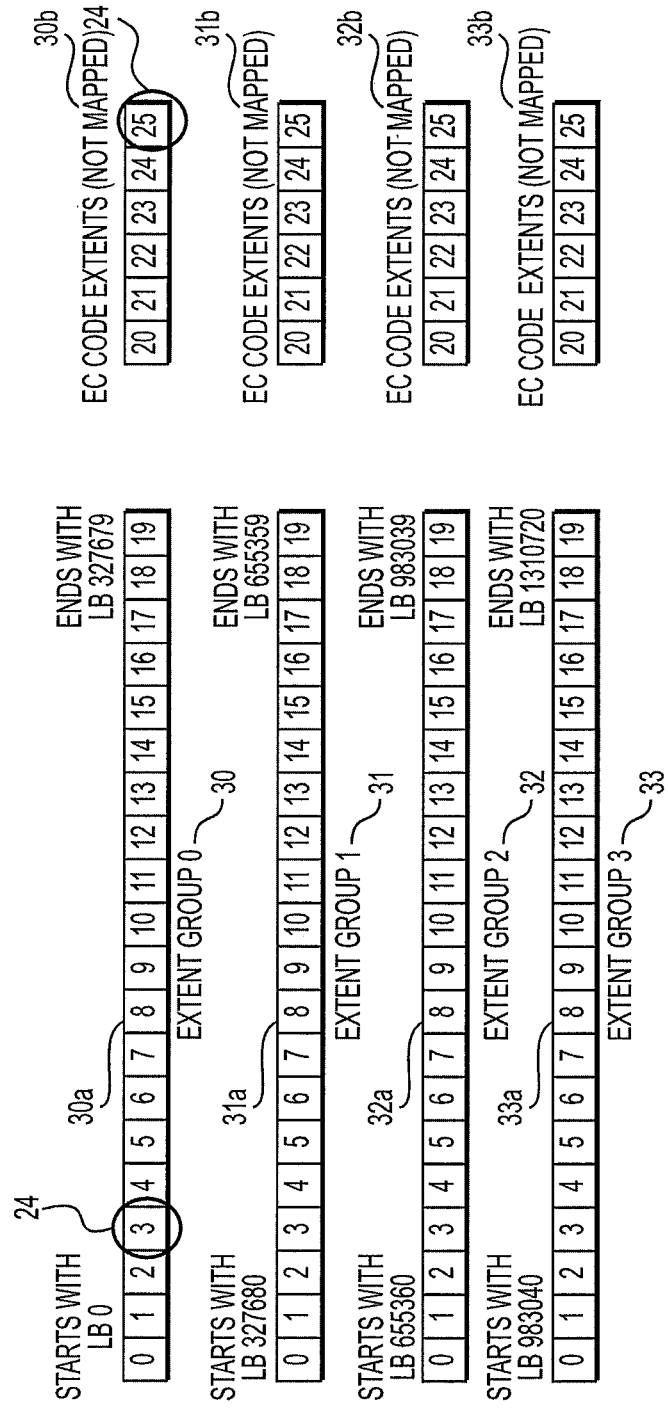
FIG. 9 is a diagram showing a representative mapping of logical blocks to extent groups for a RS/EC 20+6 protection class.

FIG. 9 is a diagram showing a representative mapping of logical blocks to extent groups for a RS/EC 20+6 protection class instance. In the RS/EC 20+6 protection class instance shown in FIG. 9, Extent Groups 0, 1, 2 and 3 provide the addressable block space of the protection class instance.

The first extent group 30 (i.e., Extent Group 0) has twenty extents 30a which provide continuous addressable block storage for data and six extents 30b for protection. Only the twenty extents 30a which provide continuous addressable block storage for data are addressable by the clients to store data. No logical addresses are provided to the clients or mapped by the extent manager 11F for the six protection extents 30b since the protection stored thereon is not subject to client I/O. Similarly, no logical addresses are provided to the clients or mapped by the extent manager 11F for the six protection extents 31b, 32b, 33b of the Extent Groups 1, 2 and 3.

Accordingly, as shown in FIG. 9, the extents 30a are mapped to provide the logical block (LB) addresses 0 through 327,679. As previously noted, an extent is 64 MB and is subdivided into 4K blocks to yield 16,384 blocks per extent 24. Thus, the twenty extents 30a have addressable blocks corresponding to addresses 0 through 327,679. Similarly, extents 31a provide the logical block (LB) addresses 327,680 through 655,359. Extents 32a provide the logical block (LB) addresses 655,360 through 983,039. Extents 33a provide the logical block (LB) addresses 983,040 through 1,310,720. As such, each extent group sequentially provides an addressable interval of blocks corresponding to the addressable interval of the previous extent group and naturally beginning with block address 0 for the first extent group.

While the extent information database 11F provides information for mapping the extents to the storage devices within the storage pool, the mapping between logical block addresses and the extents are not stored in the extent information database 11F. Instead, the mapping between block addresses and extents is determined mathematically. Therefore, the mapping between block addresses and the extent group, the extent within the extent group and the offset within the extent can be determined in accordance with the following equations (where '*' denotes multiplication, '/' denotes integer division, and '%' remainder of integer division):

$$\text{blocks\_per\_extent} := \text{extent\_size}/\text{block\_size} \quad \text{(Eq. 1)}$$

$$\text{data\_blocks\_per\_extent\_group} := \text{blocks\_per\_extent} * \text{data\_disks} \quad \text{(Eq. 2)}$$

$$\text{blocks\_per\_strip} := \text{strip\_size}/\text{block\_size} \quad \text{(Eq. 3)}$$

where
  data_disks:=number of disks used store data (i.e., "A" in a "A+B" protection class so 20 in 20+6, the 4 in 4+3)
  extent_size:=number of bytes per extent (64*1024*1024)
  block_size:=number of bytes per block (4*1024)
  strip_size:=number of bytes per strip (16*1024).

Further, the extent group, the extent within the extent group and the offset within the extent can be determined from a block address according to the following equations:

$$\text{extent\_group}(\text{block}) = \text{block}/\text{data\_blocks\_per\_extent\_group} \quad \text{(Eq. 4)}$$

$$\text{extent\_within\_group}(\text{block}) = \text{block}/\text{blocks\_per\_strip} \% \text{ data\_disks} \quad \text{(Eq. 5)}$$

$$\text{offset\_within\_extent}(\text{block}) = (\text{block } \% \text{ data\_blocks\_per\_extent\_group}/\text{blocks\_per\_strip}/\text{data\_disks} * \text{blocks\_per\_strip} + \text{block } \% \text{ blocks\_per\_strip}) * \text{block\_size} \quad \text{(Eq. 6)}$$

Additionally, the block address can be calculated from the extent group, the extent within group, and byte offset within the extent as follows:

$$\begin{aligned}
\text{block} = &\text{extent\_group} * \text{blocks\_per\_extent\_group}//\\
&\text{blocks of preceding}//\text{extent groups} \\
&+ \text{offset\_within\_extent}/\text{block\_size}/\\
&\text{blocks\_per\_strip} * \text{data\_disks} * \text{blocks\_per\_strip}//\\
&\text{blocks of complete preceding}//\text{stripes in the extent group} \\
&+ \text{extent\_within\_group} * \text{blocks\_per\_strip}//\text{blocks of preceding}//\text{strips in the stripe} \\
&+ \text{offset\_within\_extent}/\text{block\_size } \% \text{ blocks\_per\_strip}//\text{preceding blocks within}//\text{the strip} \quad \text{(Eq. 7)}.
\end{aligned}$$

Figure 10:
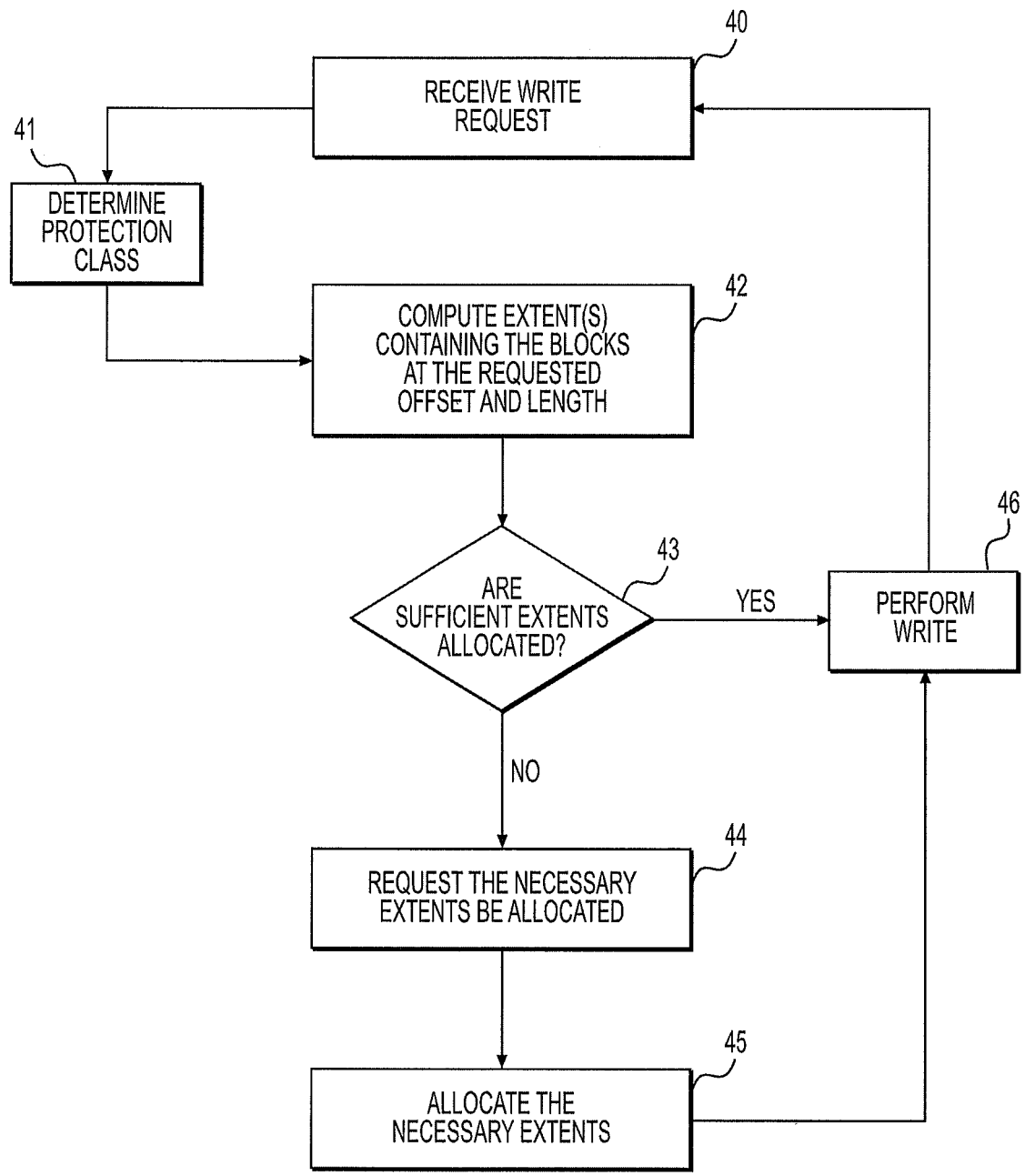
FIG. 10 is a write processing flow according to some implementations.

FIG. 10 is an example write processing flow according to some implementations. At step 40, one of the nodes 1, 2 receives a write request from a client 3 specifying write data to be stored and the write request specifies a block address (e.g., byte address), offset and length of the write data. In some implementations, the initial address space may be sparse, and write requests may be directed to any block address without requiring that extent groups are allocated for lower addresses where no writes have yet occurred. At step 41, once the write request is received, the extent management information database is referred to in order to determine whether the client which sent the request can access the particular protection class instance that the write request is attempting to modify or write to. Then, at step 42, the extents containing the blocks at the specified offset and length which are required to complete the write request are calculated. Once the required extents are calculated, at step 43, it is determined whether the required extents in the corresponding extent group have been allocated. If, at step 43, the required extents and extent group have been allocated, the processing flow proceeds to step 46 where the write request is performed and the write data is written to the storage devices 7 providing the required extents.

Figure 11:
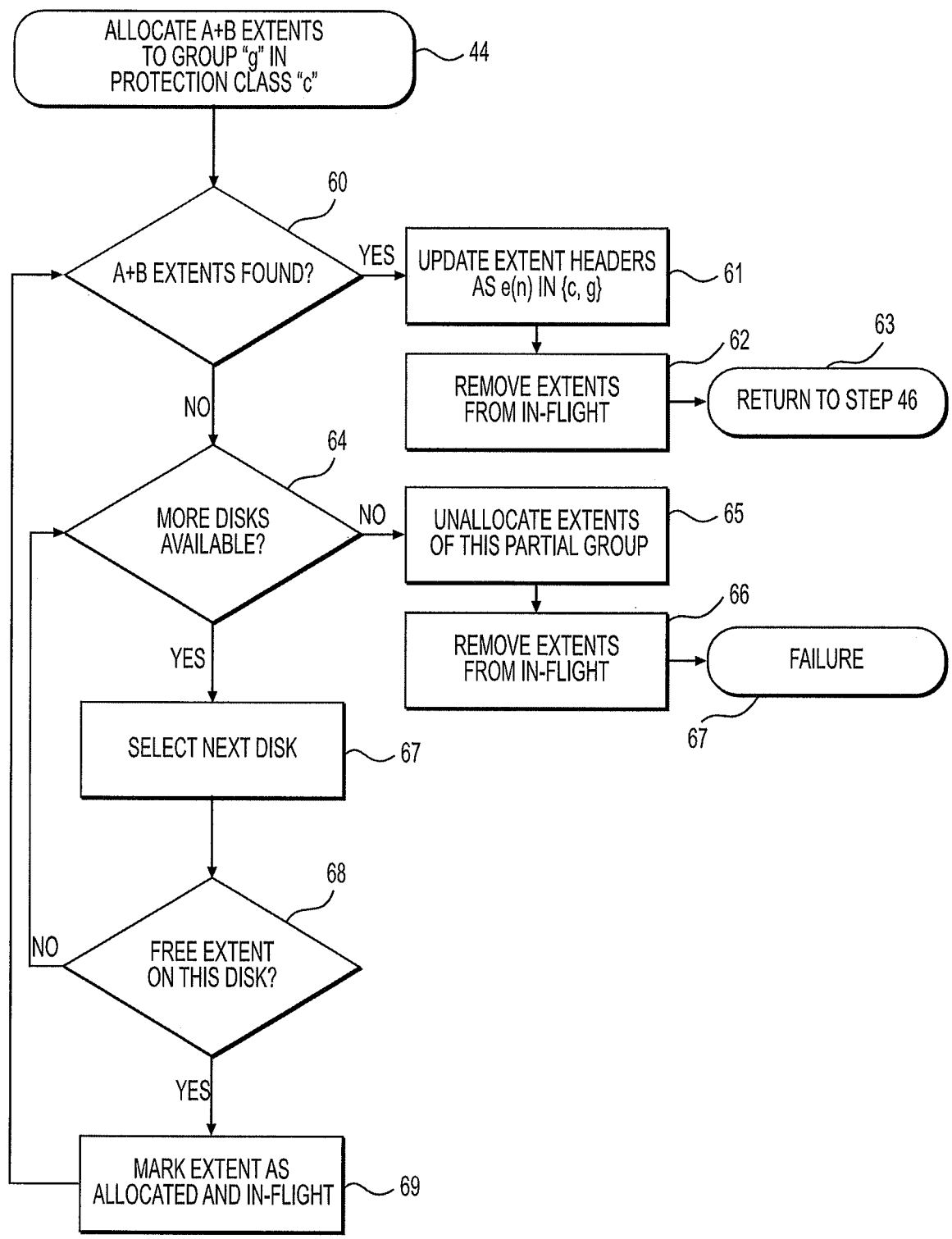
FIG. 11 is an extent group allocation processing flow according to some implementations.

However, at step 43, if the required extents and extent group have not yet been allocated to the specified protection class instance, a request is made to the extent manager 11B to allocate an extent group(s) to the specified protection class at step 44. Next, processing proceeds to step 45 where the necessary extent group(s) is allocated. FIG. 11 which is described below shows an example extent group allocation process. After the extent group(s) is allocated to the protection class at step 45, the processing flow proceeds to step 46 where the write request is performed and the write data is written to the storage devices 7 providing the required extents. Namely, as shown in FIG. 8, data is written at the block level in stripes 29 across the extents 24 of each extent group. The strips 29 within a stripe exist contiguously within the extent. As such, when a protection class receives a given write request, the hasher/striper 11D computes the parity information for each block to be written within a stripe before pushing the write data and parity information to the block level I/O 11E which interfaces with the storage devices 7 to write the stripe. Accordingly, each write request is written on a stripe-by-stripe basis in this implementation. FIG. 8 shows the arrangement of stripes across an extent group. After the write request is completed in step 46, the processing flow returns to step 40 when one of the nodes receives another write request.

FIG. 11 is an extent group allocation processing flow according to some implementations. When the extent manager 11B receives the request to allocate an extent group(s) to the specified protection class at step 43 of FIG. 10, the extent manager 11B allocates an extent group(s) as shown in FIG. 11. First, at step 60, it is determined whether enough available extents exist in the storage devices 7 of the storage pool to provide the requested extents as an extent group 'g' to the corresponding protection class instance 'c' to which the write request at step 40 is directed. Namely, for an arbitrary protection class instance 'c', each extent group thereof is provides data storage on 'A' extents and parity information on 'B' extents. Thus, each extent group is composed of A+B extents, where A and B are each integers. As such, at step 60, it is iteratively determined on a device-by-device basis whether there are A+B storage devices 7 which have A+B extents available to be allocated as an extent group 'g' to the protection class 'c'.

At step 60, if A+B extents have been found available on A+B storage devices, then at step 61, each of the extent headers are updated to reflect the allocation of the A+B extents as an extent group 'g', in the extent group ID of the extent headers 24b, and sequenced by extent number within the extent group 'g'. Further, each of the extent headers are updated to reflect the allocation of the A+B extents to the protection class instance 'c', in the protection class ID of the extent headers 24b. After the extent headers have been updated, at step 62, the designation of the A+B extents as "in-flight" is removed and the processing flow returns to step 46 in FIG. 10.

Otherwise, at step 60, if A+B extents have not yet been found in the storage pool 6, the processing flow continues to step 64 to determine if more storage devices 7 are available in the storage pool. If more storage devices are available, then at step 67, a next one of the storage devices 7 is selected and it is determined whether an available extent exists on the selected storage device by referring to the allocated extents bitmap in the superblocks 22 at step 68. At step 69, the available extent on the selected storage device is marked as allocated in the allocated extents bitmap in the superblocks 22 and is further marked as "in-flight" in the extent header 24b thereof to designate that such extents are currently in the process of being allocated as an extent group to a protection class instance and are not available to be allocated to another extent group. The designation of which extents are in-flight can be managed as a table in the extent information database 11F or in other persistent storage. Following step 69, the processing flow returns to step 60 where it is again determined whether the required number of available extents are present in the storage pool 6 to satisfy the request to allocate a new extent group to the respective protection class.

However, if more storage devices 7 are not available at step 64, the processing flow moves to step 65. At step 65, any extents that have been marked as allocated and in-flight for the extent group 'g' are unallocated from extent group 'g'. Namely, the extent headers 24b thereof are updated to show that the respective extents no longer belong to extent group 'g' of the protection class 'c'. Further, the allocated extents bitmaps of the superblocks 22 of the respective storage devices 7 are also updated at step 65. Next, at step 66, the respective extents are updated to reflect that each of the extents is no longer in-flight. As the allocation processing was unable to provide A+B available extents to fulfill the extent group allocation request, the extent allocation process is determined to have failed at step 67. In some implementations, a notification may be provided to an administrator that additional storage devices are required to be added to the storage pool 6. Moreover, since a new extent group was unable to be allocated, the write request received at step 40 in FIG. 10 will be unable to complete. Accordingly, the client should be notified that the write has failed due to a lack of available storage space.

Further, in the foregoing processing, the extent information 11F may be periodically synchronized with the management information on the storage devices 8A, 8B and storage devices 9A, 9B to protect against the loss of the extent information 11F should either of the nodes 1,2 crash. When either of the nodes crashes, the storage devices 8A, 8B and storage devices 9A, 9B can be referred to and the extent information 11F transferred therefrom. However, in some instances, one or more of the nodes may crash while one or more of the storage devices 8A, 8B and 9A, 9B suffer contemporaneous failures. In such undesirable instances, the mapping of extents to extent groups may be lost and the extent information 11F may be reconstructed after correcting any issues with the operation of the nodes 1, 2 and storage devices 8A, 8B and 9A, 9B.

Figure 12:
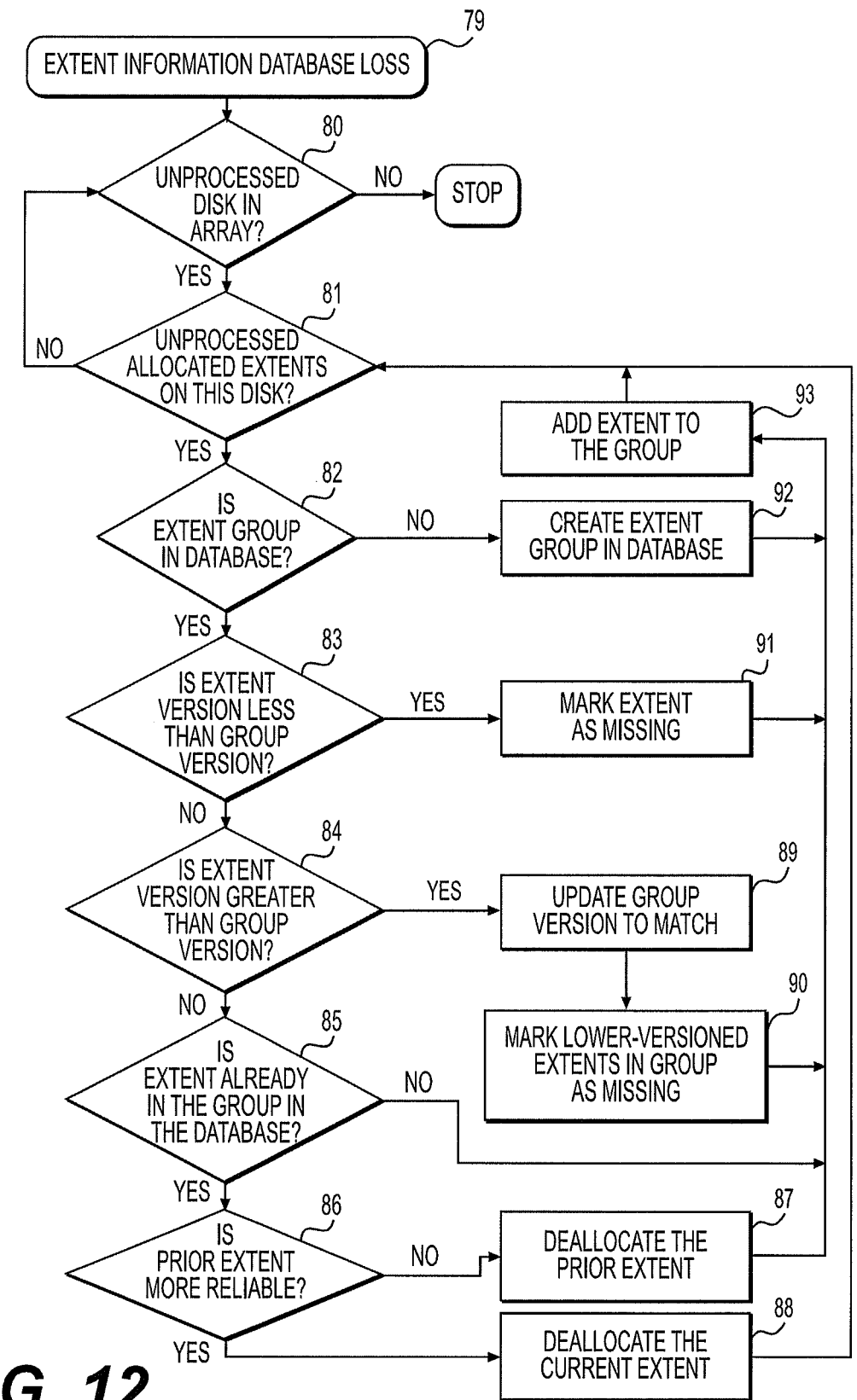
FIG. 12 is a recovery processing flow according to some implementations.

FIG. 12 is a recovery processing flow according to some implementations to reconstruct the extent information database 11F by scanning the storage devices 7 of the storage pool 6. According to some configurations, the extent information database 11F is protected against catastrophic failure of the nodes and the storage devices 8A, 8B, 9A, 9B which causes the extent information database 11F to become unavailable in the system memory 11 and the devices 8A, 8B, 9A, 9B as follows.

When the extent information database 11F is lost from the system memory 11 as well as from the copies stored in the devices 8A, 8B, or alternatively 9A, 9B, it is necessary to restore the extent information database 11F by scavenging the information regarding the allocated extents from each available device in the storage pool 6 by referring to the management information as shown in FIG. 4. The extent information database 11F needs to be scavenged from the storage pool 6 and reconstructed by one of the nodes which has recovered from the failure before client requests can be processed.

A catastrophic database failure occurs as an initial step 79 where the extent information database is lost from the system memory 11 of both nodes 1,2 as well as the storage devices 8A, 8B, and/or 9A, 9B. As such, the storage devices are scanned as follows to reconstruct the extent information database 11F. The processing flow first determines whether there is an unprocessed storage device in the storage pool 6 at step 80. When an unprocessed storage device is present in the storage pool 6, then at step 81 it is determined whether an unprocessed allocated extent is present on the unprocessed storage device to be selected for processing as in FIG. 12. If no unprocessed allocated extent is present, the processing flow returns to step 80 to select another unprocessed disk from the storage pool 6.

Otherwise, at step 82, for the unprocessed allocated extent, the extent header information is checked against all extent groups currently listed in the extent information 11F in the storage devices. If the extent header information of the unprocessed allocated extent lists an extent group which is not listed in the extent information 11F, the extent group is created in the extent information 11F at step 92 and the group version of the extent group is noted at this time. Next, the unprocessed allocated extent is added to the extent group in the extent information 11f at step 93 before moving to the next unprocessed allocated extent on the disk at step 81.

At step 82, if the extent header information of the unprocessed allocated extent lists an extent group which is already listed in the extent information 11F, then the processing flow proceeds to step 83. The extent header information of the unprocessed allocated extent is checked to determine if the extent version is less than the currently listed group version for the extent group in the extent information 11F. if the extent version is less than the currently listed group version, then at step 91, the unprocessed allocated extent is marked as "missing" before being added to the extent group in the extent information 11F at step 93.

When the extent version is not less than the currently listed group version for the extent group in the extent information 11F at step 83, then the extent version is checked to determine whether it is greater than the currently listed group version for the extent group in the extent information 11F. If the extent version for the unprocessed allocated extent is greater than the currently listed group version for the extent group at step 84, then at step 89, the group version of the extent group is updated to match the extent version of the unprocessed allocated extent. Further, at step 90, all other extents which have been previously listed as belonging to the extent group are marked as missing, and then the unprocessed allocated extent is added to the extent group in the extent information before the processing flow moves to the next unprocessed allocated extent on the disk at step 81.

If the extent version for the unprocessed allocated extent is not greater than the currently listed group version for the extent group at step 84, then the processing flow continues to step 85 where it is determined whether the unprocessed allocated extent is already listed in the extent group in the extent information 11F. If not, the processing continues to step 93 where the extent is added to the extent group. Otherwise, it is then determined whether a previously listed extent is more reliable than then unprocessed allocated extent at step 86. For each of the current and prior extents, the data stored thereon is checked against the hashes of the data. If the data and the hashes match, and no read errors occur, then the extent is considered to be reliable. If the prior extent is determined to not be more reliable at step 86, then at step 87 the prior extent is deallocated. However, at step 86, if the prior extent is more reliable than the unprocessed allocated extent, then the unprocessed allocated extent is deallocated at step 88. As such, following step 86, either the prior extent or the unprocessed allocated extent will be returned to the free table and made available to be re-allocated as in FIG. 11.

Figure 13:
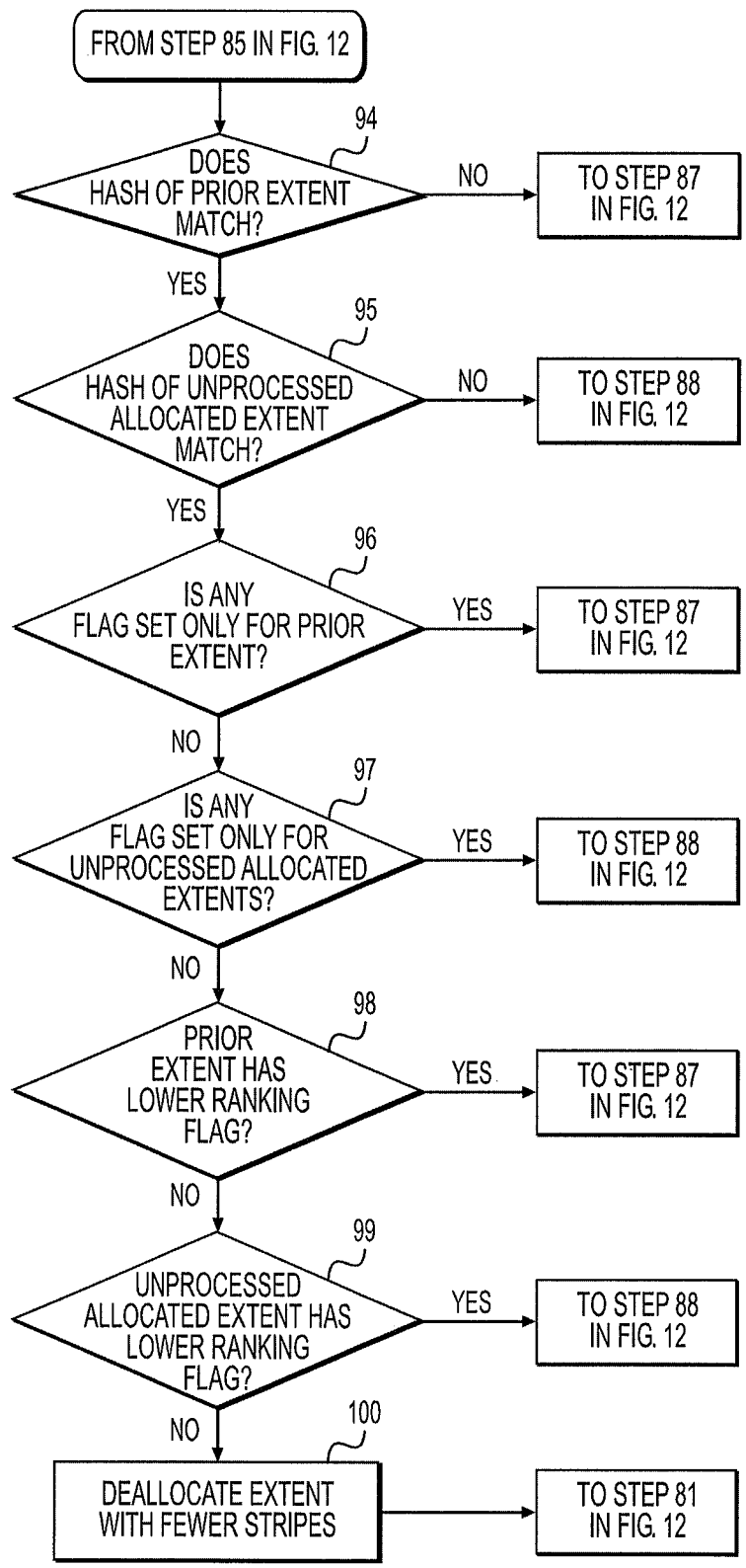
FIG. 13 is an extent reliability processing flow according to some implementations.

FIG. 13 shows an extent reliability processing flow which modifies steps 86 to 88 of FIG. 12. When determining reliability, the hash listed in the respective extent is compared with the data stored in the respective extent. That is, at step 94, the hash stored on disk for the prior extent is checked against the data stored on disk for the prior extent. Likewise, at step 95, the hash stored on disk for the unprocessed allocated extent is checked against the data stored on disk for the unprocessed allocated extent. If the hash for the prior extent does not match the data thereof, the prior extent is deallocated at step 87 since the unprocessed allocated extent is considered more reliable and the processing flow continues as shown in FIG. 12. On the other hand, if the hash for the prior extent does match at step 94, then if the hash for the unprocessed allocated extent does not match the data thereof at step 95, the unprocessed allocated extent is deallocated at step 88 since the prior extent is considered more reliable and the processing flow continues as shown in FIG. 12. Deallocation of the respective extent can be accomplished by clearing the bit for the respective extent from the allocated extents bitmap in the superblock(s) 22 of the corresponding storage device 7.

Further, if no conflict is found for the hashes of the prior extent and the unprocessed allocated extent at steps 94 and 95, the reliability of the extents are determined according to disk quality flags which can be set for each extent listed in the extent information 11F. Namely, it is checked whether flags are set for the prior extent and the unprocessed extent. Accordingly, at step 96, the prior extent is checked to determine whether any of the missing, evacuate and flaky flags have been set. If any flag is present only in the prior extent, the prior extent is deallocated at step 87. Otherwise, processing continues to step 97 where the unprocessed allocated extent is checked for any of the flags. If any flag is present only in the unprocessed allocated extent, the unprocessed allocated extent is deallocated at step 88.

However, if flags are set for both of the prior extent and the unprocessed allocated extent, then at step 98, the priority of the flags of the extents are judged as follows. An extent with an evacuate flag is considered more reliable than an extent with a flaky flag, which in turn is considered more reliable than a missing flag. If the prior extent has a lower ranking flag at step 98, then the prior extent is deallocated at step 87. If the unprocessed allocated extent has a lower ranking at step 99, then the processing flow continues to step 88. However, at step 100, there are no flags set for either the prior extent or the unprocessed allocated extent. Thus, at step 100, the extent having the fewer initialized stripes, as determined by referring to the initialized stripe bitmap portion of the extent header of extent 24B as shown in FIG. 4, thereon may be deallocated.

An extent for which the missing flag has been set corresponds to the storage device 7 for the extent being missing. A storage device may be missing for various reasons. When a storage device has become inaccessible and the extents thereon have been flagged as missing, in some circumstances the storage device may have undergone a failure. The failure of a storage device can potentially result in the loss of a large number of allocated extents. For example, on a 4 TB storage device, it is possible to provide over 65,000 extents which are each in turn able be provided as members of separate extent groups to different protection class instances. As each protection class may institute different data protection algorithms, when a storage device has failed and is missing indefinitely, the protection class instances having extents thereon may have various degrees of vulnerability to data loss. For example, extents configured to have a single protection extent such as a 1+1 or 5+1 protection class extent groups are highly vulnerable to subsequent loss of additional extents. On the other hand, extent groups for protection classes which require more than one protection extent may be less susceptible to additional extent loss. Accordingly, when the storage pool 6 experiences the failure of a storage device 7, it is necessary to determine the affected protection class instances and determine the order in which extents are to be recovered.

Figure 14:
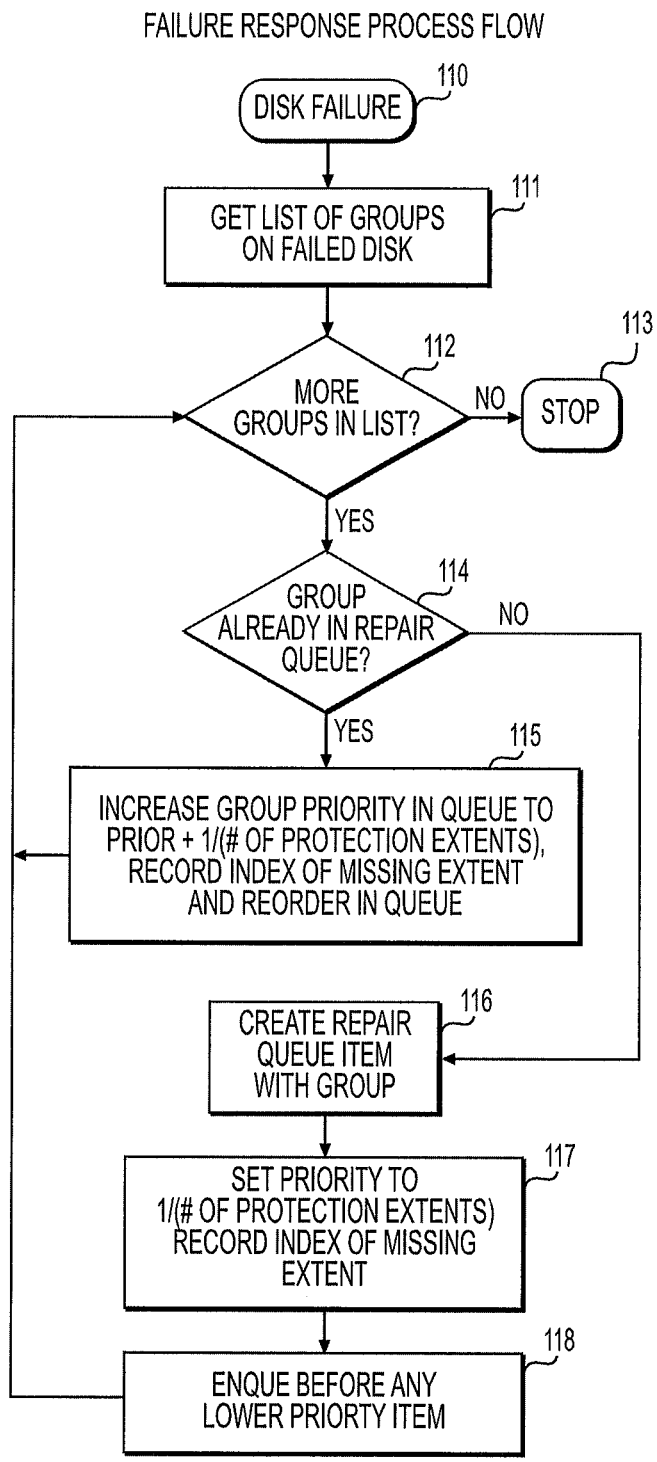
FIG. 14 is a processing flow for queuing extent groups have been impacted by the failure of a storage device according to some implementations.
Figure 15:
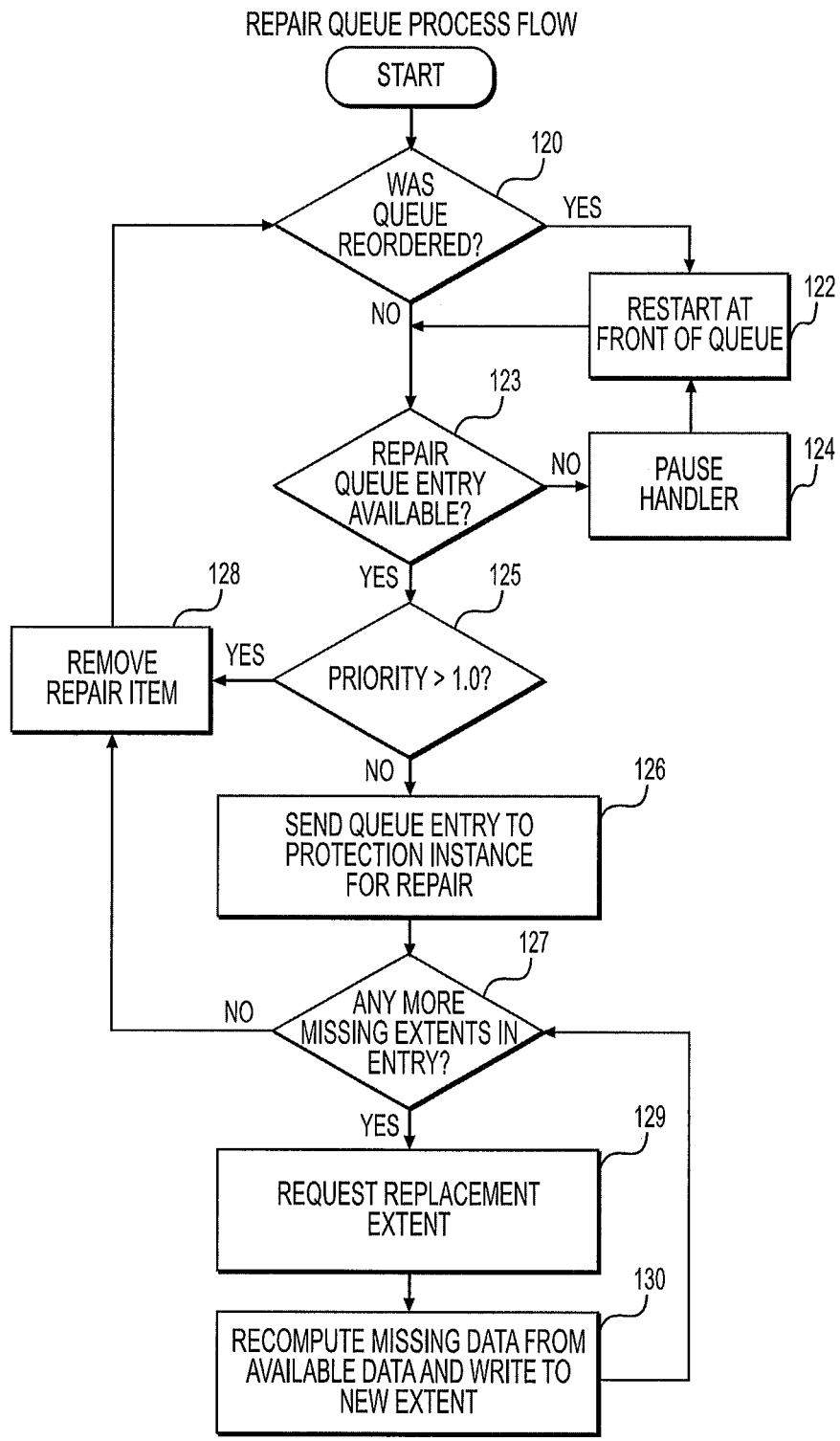
FIG. 15 is a processing flow for a repair queue organized according to some implementations.

FIG. 14 shows a processing flow for queuing extent groups have been impacted by the failure of a storage device. Further, FIG. 15 shows a processing flow for a repair queue organized according to FIG. 14.

In FIG. 14 at step 110, the device monitor 110 detects from the storage pool 6 that a storage device has failed, and a list of all affected extent groups is constructed at step 111. The list of all extent groups which have an extent on the failed disk can be determined by referencing the extent information 11F. Next, the processing flow enters a loop at step 112 which continues until all the extent groups in the list have been processed and added to the repair queue 11H before ending at step 113. Accordingly, for a given extent group selected at step 112, at step 114 it is determined whether the selected extent group already has been placed in the repair queue 11H. If not, the processing flow continues to step 116 where an item of the repair queue 11H is created for the selected extent group. Then, at step 117, a priority of the item created at step 116 is calculated. The priority is set as 1/(# of protection extents of the extent group). In other words, for an "A+B" protection class, the priority for a single disk failure may be set as 1/B. For example, a single disk loss for an "A+1" protection class results in an initial priority of 1/1=1.0 for the extent group item in the repair queue at step 117 whereas a "A+6" protection class results in an initial priority of ⅙=0.167. At step 118, the repair queue item for the selected extent group is inserted into the repair queue 11H before any other repair queue items having a lower priority.

Further, in FIG. 14, at step 114, if the selected extent group already has been created and prioritized in the repair queue 11H then the processing flow continues to step 115. At step 115, the priority of the selected extent group in the repair queue is increased. Specifically, the priority is recalculated as the previous priority in addition to 1/(# of protection extents). In other words, when more than one disk has failed, it is possible that one or more extent groups may have extents on multiple failed disks. As such, the remaining extents for these extent groups become more vulnerable to data loss and the extent groups may have their priority increased in order to be repaired sooner than extent groups less impacted by the one or more disk failures. Thus, in the case of an "A+2" protection class, the priority may initially be calculated at step 117 as ½=0.5. Subsequently, at step 115, the priority may be recalculated as the previous priority 0.5 plus (½)=1. Since the priority at step 115 may be modified, after recalculating the priority, the item for the selected extent group may be moved in the repair queue 11H before any other repair queue items having a lower priority. The processing flow continues to step 112 until each extent group in the listing of extent groups on the failed disk has been processed.

Based on the processing flow shown in FIG. 14, the repair queue 11H is updated as storage devices fail to create and maintain a prioritized listing of the extent groups which need to be repaired. For an extent group which has experienced an additional disk failure, leading to the extents thereon to go missing, the extent group may be adjusted in the repair queue 11H to have an increased priority to be repaired. However, should any extent group generate a priority greater than 1.0, data loss may generally be deemed to have occurred for the extent group.

Turning to FIG. 15, a repair queue processing flow is shown. The repair queue processing flow starts in FIG. 15 after one or more items are added to the repair queue 11H in FIG. 14. As an initial matter, it is determined at step 120 whether the repair queue 11H was been reordered. If the repair queue has been reordered, the repair process is restarted for the extent group listed in the first item in the repair queue at step 121. Otherwise, at step 123, the next available repair queue item is selected. If no repair queue items remain in the repair queue 11H, then the repair process is paused at step 124 until one or more items are added to the repair queue 11H as shown in FIG. 14.

After the next available repair queue item is selected at step 123, it is determined whether the priority of the repair queue item is greater than 1.0 at step 125. As discussed above, should any extent group cause an item in the repair queue 11H to have a priority higher than 1.0, data loss is generally assumed to have occurred in the extent group. As a result, an extent group with a priority greater than 1.0 may be deemed irreparable and removed from the repair queue at step 128. If the priority of the repair queue item is less than 1.0, then at step 126 the corresponding extent group is sent to the protection instance to which it is allocated for repair. Next, at step 127, if there are any "missing" extents in the extent group of the selected item, then processing continues to step 129. Otherwise, the processing flow continues to step 128 where the selected item is removed.

At step 129 in FIG. 15, a replacement extent is requested to be allocated by the extent manager 11B to the extent group for the missing extent in the extent group which has a missing flag. As such, any missing extent which is inaccessible due to the failure of a storage device 7 can be replaced by providing an available extent for each missing extent from the other storage devices 7 in the storage pool 6. Namely, replacement extents are selected from storage devices 7 in the storage pool 6 which do not store an extent which belongs to the extent group by referring to the allocated extent bitmaps in the superblocks 24 of the storage devices. Once a replacement extent has been provided for a missing extent in the extent group of the selected item, the data on the missing extent is able to be recomputed from the non-missing extents in the extent group at step 130. As each protection class provides data protection using different protection algorithms, the data on the missing extent is recomputed according to the algorithms specific to the protection class to which the extent group is allocated. As such, the non-missing data extents and non-missing protection extents are referred to in order to recompute the missing data. Once the missing data is recomputed, it is written into the replacement extent at step 130.

As shown in FIG. 15, steps 127 to 130 are repeated for each missing extent in the extent group. At step 127, once no more "missing" extents exist in the extent group of the selected item, the selected item is removed from the repair queue 11H at step 128. Following step 128, the repair queue 11H is checked to determine whether it has been reordered at step 120. If the repair queue 11H has been reordered as in FIG. 14 at step 115, the processing flow in FIG. 15 proceeds to restart at the front of the queue at step 121. Otherwise, the next available repair queue item is selected and processing continues as shown in FIG. 15.

According to the processing flows shown in FIGS. 14 and 15, when a failure occurs in the storage pool 6 causing one or more allocated extents to become missing extents, the data of the missing extents is recomputed. When multiple missing allocated extents exist, the missing extents are repaired according a prioritized order which depends on the missing extents effect on the data integrity of the extent groups to which they respectively belong. As such, the restoration of data of missing extents which are more vulnerable to data loss due to subsequent storage device failure in the same extent group may be prioritized over the restoration of missing extents which are effectively less vulnerable to additional storage device failure.

Further, as in FIGS. 14 and 15, when a failure occurs in the storage pool 6 causing one or more allocated extents to become missing extents, replacement extents from unallocated available extents on the storage pool 6 are allocated to the corresponding extent groups which have missing extents to provide replacement storage for the missing data. Accordingly, by providing replacement extents from the storage pool to supplement the extent groups affected by storage device failure, there is no need to provide dedicated hot spare devices or for urgent administrator attention to replace a failed storage device. Any available extents in the storage pool are able to serve as replacement for missing extents. Restoring the data of the missing extents is, advantageously, able to significantly reduce the time required to restore a repairable extent group as compared to conventional RAID systems since any data recomputed as in FIG. 15 is directed as I/O across one or more replacement extents across multiple storage devices rather than to a single hot spare or replacement storage device provided by an administrator.

In other words, the replacement extent(s) allow data of a failed storage device to be spread across multiple storage devices immediately upon the device monitor 110 detecting that the storage device has failed. Further, the order in which replacement extents are allocated and missing data is recomputed is prioritized according to the vulnerability of the remaining extents in the affected extent groups to further storage device failures. Moreover, the prioritization is adjustable if additional storage devices fail up to the protection limit provided by the protection class.

While FIGS. 12-13 relate to processing following failures or crashes which affect the extent information database 11F and FIGS. 14-15 relate to processing following the failure of a storage device 7 for some examples, other examples address problems caused by failures which occur during data writing.

In general, when writing data in stripes across multiple storage devices 7, a failure or crash can leave one or more stripes in an unrecoverable state. In conventional RAID systems, this is referred to as a "RAID5 hole". Due to the failure or crash, it is impossible to know which parts of the stripe were written successfully and which were not completed, rendering the entire stripe invalid. Conventional RAID systems provide an uninterruptible power supply, battery-backed caches, or a combination thereof to address the problem of partially written stripes.

Some examples may address a problem where a failure or crash of one of the nodes occurs when writing stripes across the extents 24 of an extent group during a write operation to the storage pool 6. Specifically, the write data is used to compute a parity journal entry so that if a failure occurs during a write operation, in the best case, a partial write can be completed using erasure coding and using the data which was successfully written, and in the worst case, the integrity of portions of the stripe which would not have been affected by the write operation can be assured upon recovering from the failure or crash. While the description herein refers to parity journaling, a given parity journal entry may contain either parity information or error correction coding as in the case of RS/EC 20+6 protection class instances. Accordingly, the calculation of the list of protection blocks for a given journal subentry 25b as shown in FIG. 4 will depend on the protection algorithms of the respective protection class which the journal subentry 25b pertains to.

These examples may be based upon the thin provisioned block storage environment described above and the description of this embodiment is directed to the portions thereof which are additional to or modifications of the description of the examples already discussed above.

As shown in FIG. 4, journal segments 23A and 23B are provided for each of the nodes 1, 2 on the storage devices 7 in the storage pool 6. Journaling to multiple storage devices is used to provide a transactional layer for writing or updating existing data and protection blocks within a stripe 28 of an extent group. As such, in some examples, there is no need to include an uninterruptible power supply, battery-backed caches, or a combination thereof in the nodes 1,2 shown in FIG. 2. While it is possible to journal all data involved in a write, doing so may use substantial computational and disk I/O processing overhead.

Accordingly, in some examples, a type of journaling referred to herein as "parity journaling" is described. For example, the RS/EC 20+6 protection class provides significant data protection for each stripe, which allows for the parity journaling to provide guaranteed protection for stripe data unmodified by the write operation and further uses the erasure code protection data to recover and complete any interrupted writes when possible. Parity journaling has lower computational and I/O requirements than full data journaling, while incurring a slightly higher degree of risk that data may be corrupted. Moreover, with parity journaling, even the journal entries themselves in the journal segments 23A, 23B can be recovered should one or more storage devices 7 experience a failure when attempting to replay the parity journal depending on the protection class characteristics and the number of journal entries affected by the storage device failures.

As in FIG. 4, dedicated regions of each storage device are provided as the journal segment 23A, 23B, and journal subentries exist therein. Each node writes its journal entries sequentially in the respective journal segment. Thus, node 1 writes journal entries 25B in the node 1 journal segment 23A, for example, while node 2 writes journal entries 25B in the node 2 journal segment 23B in the case of the two node system shown in FIG. 1. Each write request from the clients 3 causes a corresponding journal entry to be created, and each journal entry has a copy written to at least as many disks as the number of protection extents for the extent group to which the write request is directed. Therefore, each journal entry shares the same level of protection as the extent group to which it corresponds.

Figure 16:
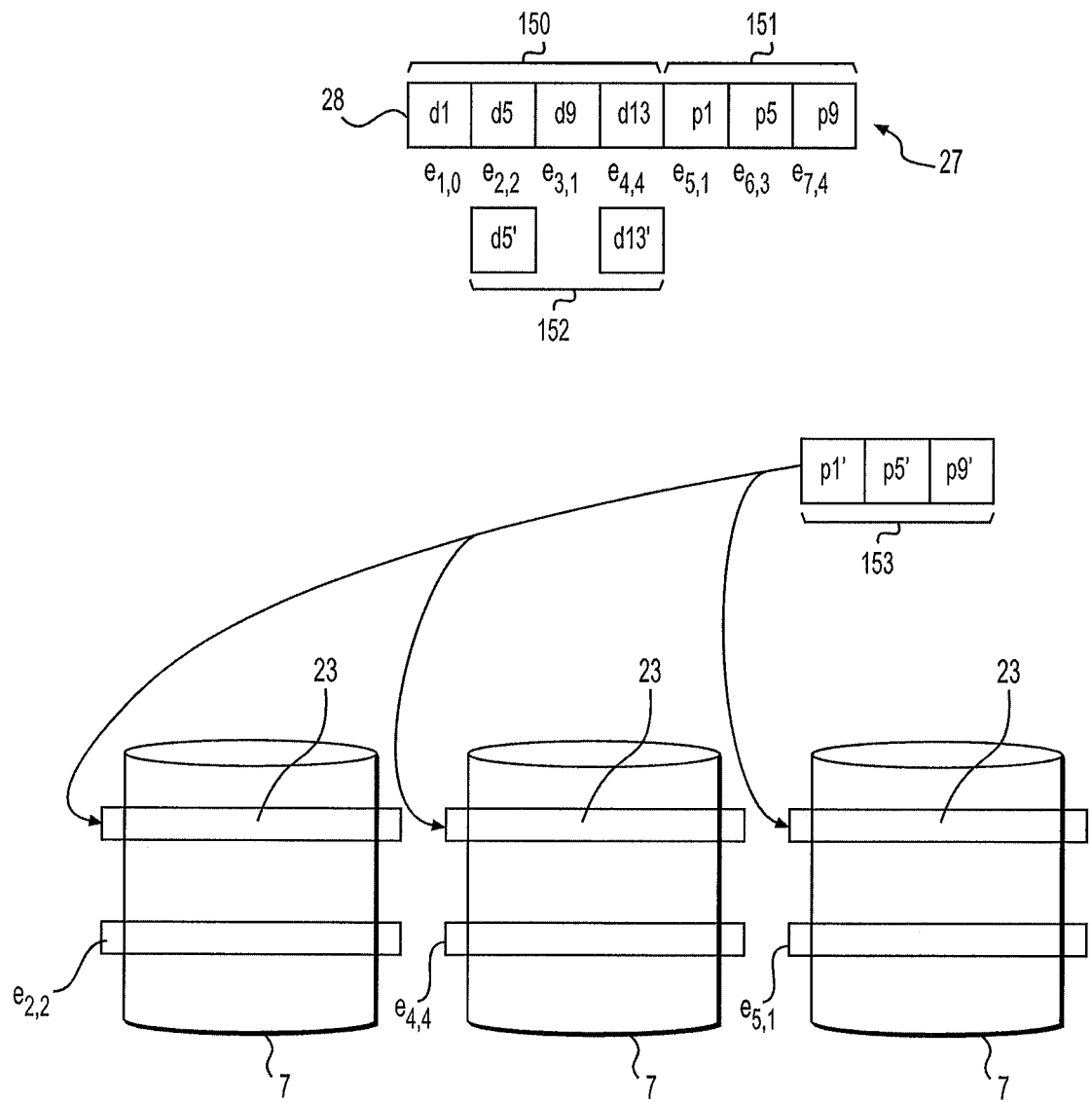
FIG. 16 shows an example distribution of journal entry copies for a write operation to an extent group for the parity line shown in FIG. 8 according to some implementations.

FIG. 16 shows an example distribution of journal entry copies for a write operation to the protection line shown in FIG. 8 according to some implementations. In general, the placement of parity journal entries within the storage pool is constrained so that journal entries for a respective write operation and placed on storage devices which do not store data which was unmodified by the respective write operation. In other words, when storing the copies of a journal entry, no storage device which stores unmodified data may store a journal entry which includes parity information describing the unmodified data. FIG. 8 shows a simplified example for the case in which the protection line 27 in FIG. 8 is subject to a write which modifies a portion of the blocks thereof.

Figure 17:
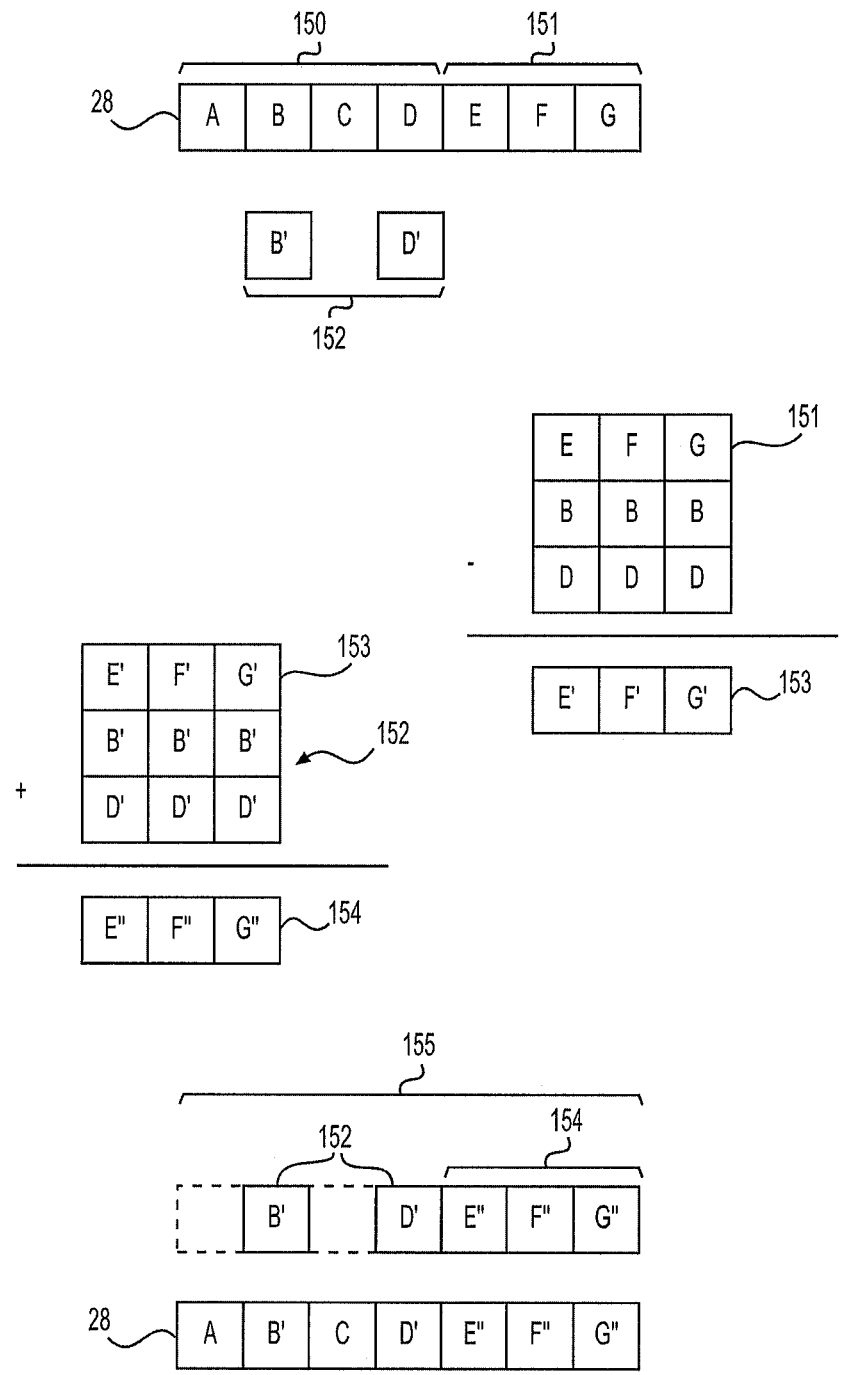
FIG. 17 is a drawing showing the relationship between an existing stripe of data, new data to be written and the computation of parity blocks according to some implementations.

Given the protection line 27 in FIG. 8 which consists of blocks as $d_1$, $d_5$, $d_9$, $d_{13}$ (as client data 150), $p_1$, $p_5$, $p_9$ (as protection data) which is stored across the 7 distinct extents $\{e_{1,0}, e_{2,2}, e_{3,1}, e_{4,4}, e_{5,1}, e_{6,3}, e_{7,4}\}$ of extent group $eg_0$, if a write is directed to the protection line 27 which includes new data 152 consisting of blocks d5' and d13' then the unmodified data blocks are d1 and d9 which are respectively stored on extents $e_{1,0}$, and $e_{3,1}$. When the parity journal entries including parity blocks 153 for the new data 152 are to be stored, the parity journal entries may be located on any storage devices other than the storage devices which have the extents $e_{1,0}$, and $e_{3,1}$ thereon. As such, in FIG. 8, it is acceptable to store the parity journal entries in the journal segments 23 of the storage devices 7, which also store the extents $e_{2,2}$, $e_{4,4}$, and $e_{5,1}$, for example. The parity journal entries may also be stored on any other storage devices 7 in the storage pool other than the storage devices which have the extents $e_{1,0}$ and $e_{3,1}$ thereon. The calculation of the parity blocks 153 is shown in FIG. 17. As shown in FIG. 16, a journal entry includes the parity blocks 153 corresponding to the unmodified data blocks 150. In this implementation, three parity blocks $p_{1'}$, $p_{5'}$, $p_{9'}$ make up the protection data for the journal entry. Each of the three parity blocks is stored separately in a journal entry copy 25b on the storage devices 7. That is, $p_{1'}$ is stored on a storage device 7 different from the storage devices where the journal entry copies containing $p_{5'}$ and $p_{9'}$, and vice versa.

Each journal entry 25B in a journal segment of a storage device 7 has at least an entry checksum, a list of block numbers (e.g., addresses) that may be updated in for the write, a CRC or checksum for the new data for the write, and parity blocks for each affected block in the parity line that is not being updated. A different parity block is included in each copy of the journal entry 25B. The parity blocks can be calculated from the data being written, the data being replaced, and the parity blocks being replaced as will become evident from the following description.

FIG. 17 is a drawing showing a generalized relationship between an existing stripe of data, new data to be written, and parity computation. In the implementation shown in FIG. 17, a an existing stripe 28 consists of data blocks 150 storing client data (A,B,C,D) and protection blocks 151 storing parity (E,F,G) of the data blocks. Further, the existing data blocks (B,D) are to be modified with new data blocks 152 (B',D') by a write request. First, in the parity journaling, the parity 153 (E',F',G') of the unmodified data is calculated by subtracting out the data to be modified in the write (B,D) from the existing parity 151 (E,F,G). In the implementation shown in FIG. 17, parity calculations are performed on a block basis. However, in other implementations, the parity calculations may be performed on each strip 29 of a stripe, on each parity line 27 as shown in FIG. 16, or on entire extents 24.

Secondly, to calculate the new parity 154 (E",F",G") of the stripe 28, the parity 153 (E',F',G') is added with the new data blocks 152 (B',D'). In FIG. 17, the parity blocks 153 (E',F',G') form the parity blocks of the journal entry 25B for writing the new data blocks 152 (B',D'). Thus, the parity blocks 153 are written to storage devices 7 in the respective journal segment 23 for the node performing the write request. Further, the data 155 to be written into the stripe 28 consists of the new data blocks 152 (B',D') and the new parity 154 (E",F",G"). Accordingly, the write request is committed to the relevant extent group when the existing stripe 28 is updated to (A,B',C,D',E",F",G").

Figure 18:
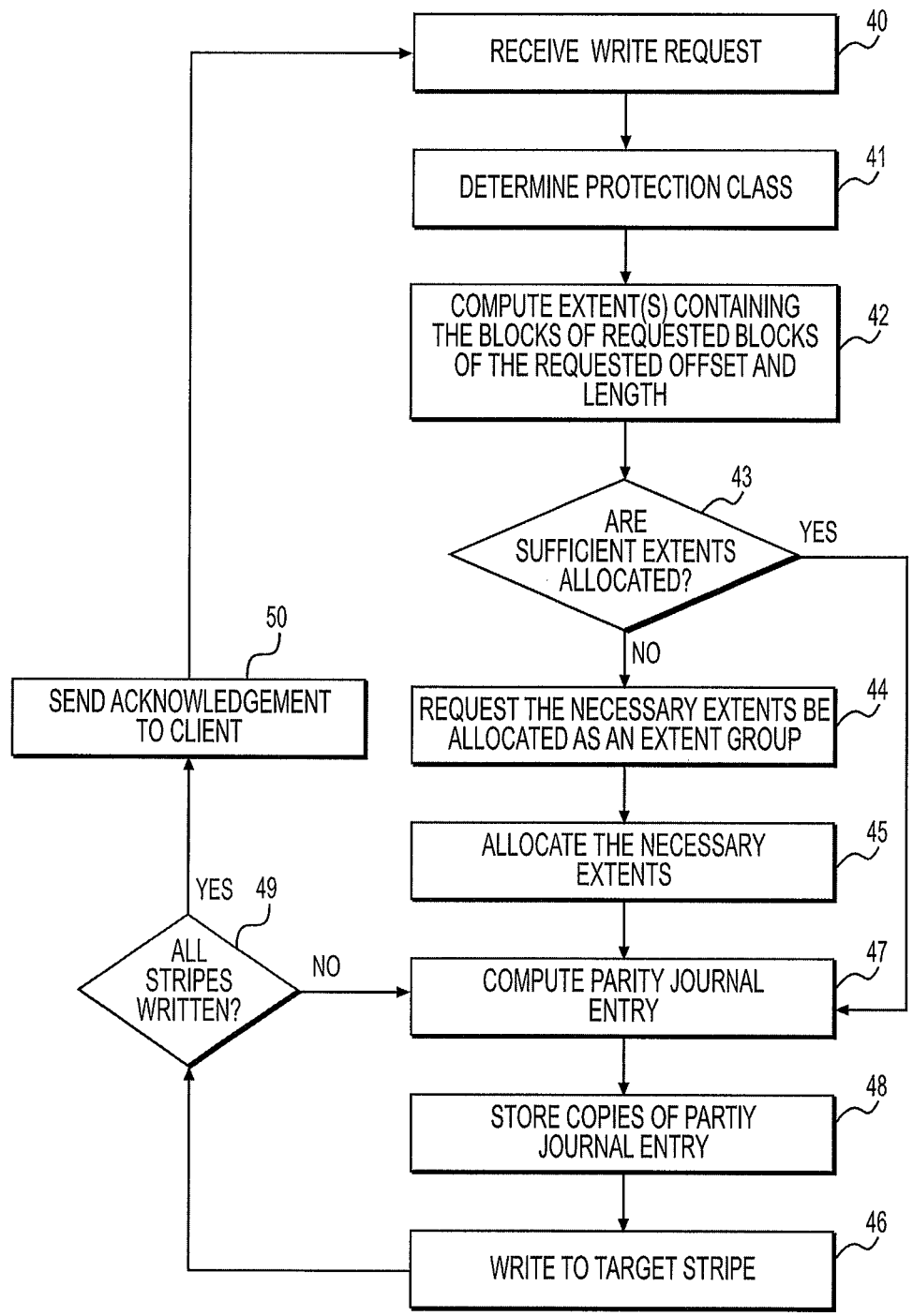
FIG. 18 is a write processing flow according to some implementations.

FIG. 18 is a write processing flow with parity journaling according to some implementations. It is assumed in FIG. 18, that the one operational node performs the write processing flow while the other node remains as a backup. Steps 40 to 45 in FIG. 18 are the same as in FIG. 10. The write processing flow in this example differs in that steps 47 and 48 are added prior to writing data at step 46. As shown in FIG. 18, after the extent group(s) is allocated to the protection class at step 45, the processing flow proceeds to step 47. Steps 47, 48, 46 and 49 represent data writing on a stripe-by-stripe basis. At step 47, the parity blocks 153 for the parity journal entry are calculated for the first stripe to be written to. Then at step 48, copies of the parity journal entry are stored across the storage pool 6. Furthermore, the active segment count and list of active segments in the journal segments 23 may be updated to reflect the operation. After the storing the copies of the parity journal entry, the data 155 to be written to the first stripe, including the new data 152 and new parity 154 is committed to the first strip of the extent group specified by the write request at step 46. Then, at step 49, the processing flow may return to step 47 to continue the processing flow previously described until all stripes specified by the write request are completed. Once all journal entries have been recorded and all stripes updated, the processing flow returns to step 41 to handle the next write request after sending a write completion acknowledgement to the client which sent the write request at step 50.

Figure 19:
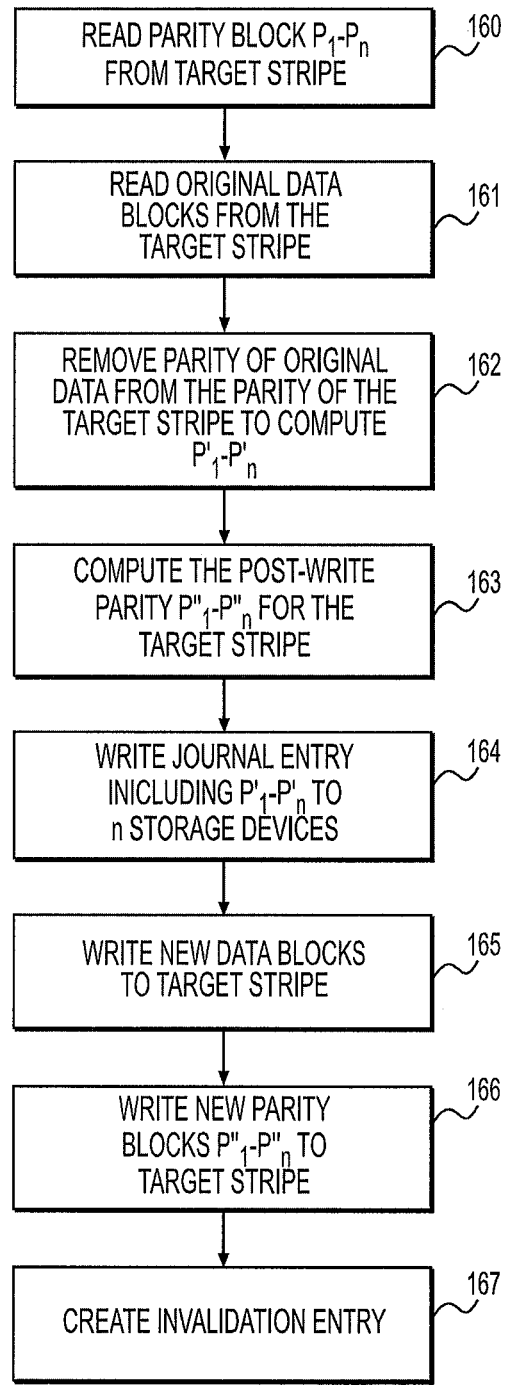
FIG. 19 is a detailed processing flow of the computation of the parity journal, storing of journal entry copies and block data writing.

FIG. 19 is a detailed processing flow of the computation of the parity journal, storing of journal entry copies and block data writing according to some implementations. FIG. 19 depicts the parity journaling and data writing process accordingly to some implementations on a stripe-by-stripe basis. Namely, according to the processing flow shown in FIG. 19, journal entries are created sequentially for each stripe(s) which is to be modified by a write request. First, at step 160, the parity blocks $p_1$ to $p_n$ are read from the target stripe which is to be modified by the write request. The parity blocks $p_1$ to $p_n$ are shown in FIG. 17 as blocks 151 (e,f,g). Next, the original, unmodified data blocks are read from the target stripe at step 161. In the case of writing to a newly allocated extent group, the original data is assumed to be zero with corresponding zero parity. By referring to the initialized stripe bitmap in the extent header 24b, it can be determined that a given stripe has not been previously used to store data and is hence considered to be zero. In FIG. 19, if the stripe 28 had not yet been written to, blocks 151 (e,f,g) would all have zeros.

The unmodified data blocks are shown as blocks (b,d) in FIG. 7 whereas the new write data is shown as data blocks 152 (b',d'). Then at step 162, the parity of the original data blocks is removed from the parity of the target stripe to compute $p_1'$ to $p_n'$. The parity blocks $p_1'$ to $p_n'$ are shown as parity blocks 153 (e',f',g') in FIG. 17. The post-write, or new, parity blocks $p_1''$ to $p_n''$ are then calculated from the parity blocks $p_1'$ to $p_n'$ and the write data for the target stripe at step 163. The post-write parity blocks $p_1''$ to $p_n''$ are shown as parity blocks 154 (e",f",g") in FIG. 17.

Next, at step 164, copies of the parity journal entry containing the parity blocks $p_1'$ to $p_n'$ are separately written to "n" separate storage devices where "n" is the number of parity blocks in the target stripe. While the "n" storage devices 7 may be selected from any of the storage devices 7 in the storage pool 6, to provide the maximum protection against storage device failure, the "n" storage devices which store the journal entry copies may be different from the storage devices 7 which provide the extents having the target stripes of the write request. In some implementations, additional journal entry copies may be stored on one or more additional storage devices with only the journal entry metadata shown in FIG. 4, that is, without the parity blocks. Upon writing the "n" copies of the parity journal entry at step 164, at step 165, the new data blocks are written to the target stripe. After writing the new data blocks to the target stripe, the new, post-write parity blocks $p_1''$ to $p_n''$ are written to the target stripe at step 166. At this time, the write processing can move to the next target stripe which is to be modified as shown in FIG. 18 at step 48, for example.

In addition, after finishing writing the new parity blocks at step 166, an invalidation entry 25a is created in the corresponding journal segment 23 at step 167. The created invalidation entry corresponds to the journal entry written at step 164. Further, the active segment count and list of active segments may be updated to reflect that the write has completed. However, as explained above, when a node experiences a failure or crash rendering it non-operational, another node takes over from stand-by. Before the node can take over handling data requests from the clients, the node must determine whether the write requests handled by the failed node have completed or not and whether any data has been lost. By examining the journal segments 23 which correspond to the failed node, the journal entries of incomplete writes (e.g., any pending write processes which have not reached step 167) can be replayed to determine whether the data on targeted stripes by the outstanding write requests have successfully completed. Thus, in FIG. 19, any journal entries written previously at step 164 which exist in the journal segments for a failed node are indicative of an incomplete write operation.

During the write processing flow of FIG. 19, the node performing the write operation may potentially fail at any time. If the node fails prior to step 164, no journal entries may be written to the "n" storage devices. Further, the write processing flow of FIG. 18 may fail to reach step 49 and the client may not receive an acknowledgment that the write has completed. Further, the other one of the nodes, which did not initially handle the write operation, takes over operations for the failed node may not find any journal entry present for the write which was being processed at the time of failure. As a result, in this example, a failure or crash during the write processing before step 164 in FIG. 19 may result in the write being completely lost and the client must resend the write request.

If the node fails after beginning step 164 but prior to completion of step 165, some portion of journal entries may have been written in the journal segments 23 of up to the "n" storage devices. However, the write processing flow of FIG. 18 may still fail to reach step 49 and the client may not receive an acknowledgment that the write has completed. Further, the node which takes over operations for the failed node may find some portion of the journal entries which were written in the journal segments 23 of up to the "n" storage devices at step 164. By performing the recovery processing flow as shown in FIG. 21 to reference the journal segments of the failed node, it may be determined that the data writing failed to complete.

Further, if the node fails after beginning step 165 but prior to step 167, the journal entries may be fully written in the journal segments 23 of the "n" storage devices at step 164. However, some portion of the new data blocks and/or the new parity blocks may have been written to the target stripe. However, the write processing flow of FIG. 18 may still fail to reach step 49 and the client may not receive an acknowledgment that the write has completed. Further, if any "A" extents in an extent group for an A+B protection class instance were written to before the failure of the node, the write request can be completed. Otherwise, the blocks which were targeted during the write processing may be zeroed out and the protection information for the unmodified portions of the target strip may be restored by referring the journal entry.

Figure 20:
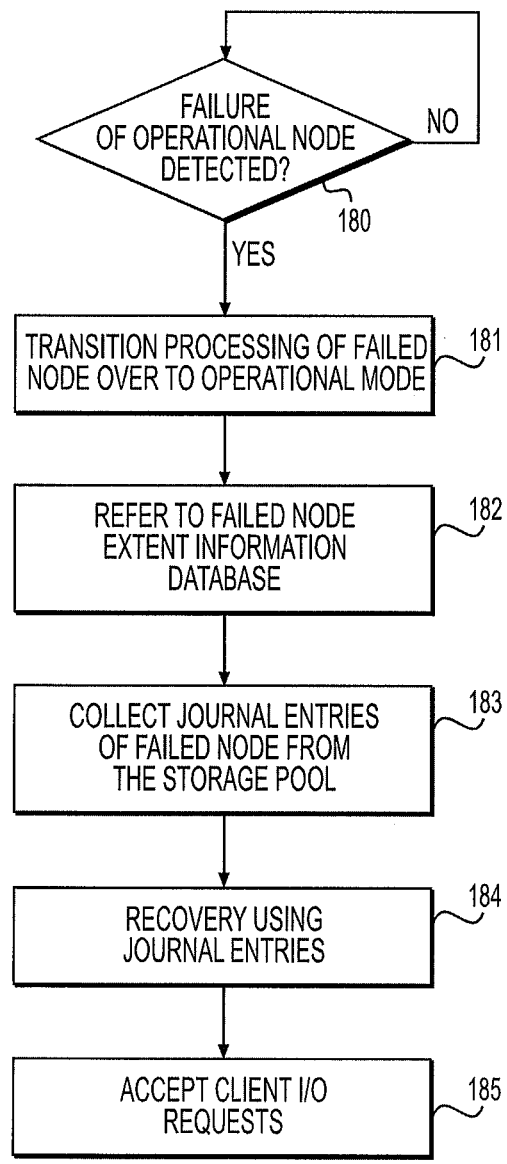
FIG. 20 is a failure detection processing flow for detecting and responding to a failure or crash of one node by another node.

FIG. 20 is a failure detection processing flow for detecting and responding to a failure or crash of one node by another node. The heartbeat monitoring provided in the system memory 11 of each of the nodes continuously monitor the other node to detect when a failure or crash has occurred in either of the operational nodes at step 180. When a failure is detected at step 180, the node which remains operational transitions to perform I/O processing for the failed node at step 181. At step 182, the extent information 11F maintained by the failed node may be referred to by the now operational node if necessary. Further, at step 183, the journal entries in the journal segments corresponding to the failed node are collected from the storage devices 7 in the storage pool 6. For example, in the journal segments 23, a list of active segments and an active segment count are included. Assuming that the list of active segments and the active segment count do not conflict, the active journal entries which need to be collected at step 183 can be restricted to the list of active segments. Otherwise, the journal segments 23 of all the storage devices may be referred to in order to collected the active journal entries. While copies of each journal entry is written to "n" storage devices, the copies of the journal entry as calculated at step 164 are considered to be a single journal entry describing data writing to a target stripe. Then at step 184, recovery of any write requests which were being performed by the failed node begins using the journal entries. The recovery at step 184 is shown in detail in FIG. 21. After recovery has completed at step 184, the now operational node can begin to process client requests, such as new write requests as in FIGS. 18-19, after as much data as possible was recovered during the recovery processing of FIG. 21.

Figure 21:
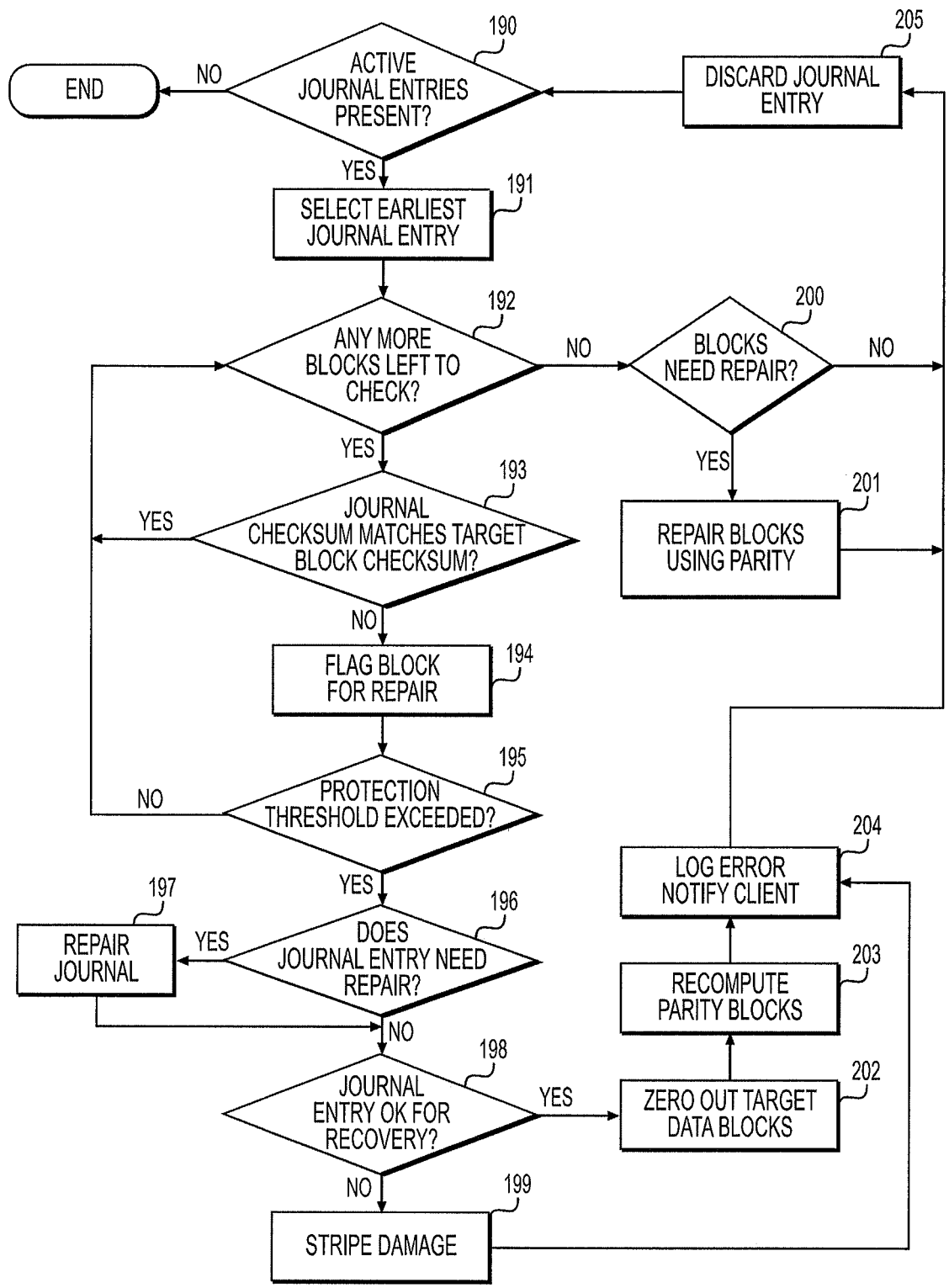
FIG. 21 is a recovery processing flow with parity journaling according to some implementations.

FIG. 21 is a recovery processing flow with parity journaling according to some implementations. At step 190, as an initial matter, it is determined whether any active journal entries are present from the collection at step 183 in FIG. 20. Active journal entries are those journal entries 25b in the journal segments 23 which do not have corresponding invalidation entries 25a. When one or more active journal entries are present, the earliest journal entry is selected at step 191. For the selected journal entry, the processing flow proceeds to step 192 where the individual blocks of the extent group are individually checked on a block-by-block basis. First, at step 193, the block hash recorded in the selected journal entry 25B is compared with the target block checksum listed in the extent block hashes of the extent header 24b. If the checksums match at step 193, then the checksums of the next block are checked by returning to step 192. Otherwise, when the checksums do not match at step 193, the target block is flagged for repair at step 194. Next, at step 195, due to the data in the target block being found to be inconsistent, it is determined whether the protection threshold of the target stripe has been exceeded. That is, it is checked whether the data protection of the target stripe has been compromised, and cannot be recovered, due to the target blocks having data which has been affected by the node failure which exceeds the protection level provided by the protection class.

If the data protection provided by the target stripe has not been compromised, then the processing flow in FIG. 21 returns to step 192 to process the next block in the stripe. Once all blocks have been checked at step 192, the processing flow moves to step 200 where it is checked whether the blocks need to be repaired. If repair is needed, then at step 201 the blocks flagged at step 194 are repaired using the parity blocks which were written to the extents. At step 201, the blocks within the extent group that matched the checksums/hashes in the journal entry at step 193 are used to repair the blocks which were flagged for repair at step 194 using the parity or erasure coding techniques associated with the protection class to which the extent group belongs and the available protection information.

After repairing the blocks at step 201 or when no repair is needed, the journal entry 25B is discarded, and it is checked whether any active, non-invalidated journal entries are remaining in the respective one of the journal segments (e.g., one of 23a or 23b) at step 190 for the extent group associated with the previous journal entry selected at step 191. When no more active journal entries are present at step 190 for the extent group associated with the previous journal entry selected at step 191 in the respective one of the journal segments, the data in the extent group is considered up to date and new write requests to the extent group can be processed by the nodes 1,2.

Otherwise at step 196, it is determined whether the journal entry itself needs to be repaired. If repair is needed, then at step 197 the journal entry is repaired Here, unmodified blocks from the extent group and the copies of the parity journal entry are used to repair the journal using the parity or erasure coding techniques associated with the protection class to which the extent group belongs. At step 198, the journal entry is checked to determine whether it is suitable to be used for recovery. If not, the target stripe for the selected journal entry is considered to be damaged at step 199, and an error is logged for the target stripe and the client is notified at step 204 before discarding the journal entry at step 205. However, if the journal entry is suitable for recovery of unmodified portions of the target stripe, then the data blocks which were attempted to be written to are zeroed out at step 202. By zeroing out the target data blocks, no data will be lost and makes it unnecessary to compute parity from the known garbage data which existed in the target data blocks. In other words, any data existing in the target data blocks was only important in the sense that balanced the unmodified parity calculations. Then, the parity blocks for the unmodified parts of the target stripe may be recovered from the parity blocks recorded in the repaired journal entry at step 203 and stored in the target stripe. After step 203, an error is logged for the target stripe and the client is notified at step 204 before discarding the journal entry at step 205. Once all journal entries have been processed as shown in FIG. 21, client requests are then accepted by the node as shown in step 185 at FIG. 20.

U.S. Application PCT/US14/51419, which is herein incorporated by reference, discloses a file system service which is provided over a block storage service and is also provided with a highly-available, transaction-safe relational database to manage data storage. In some implementations, the block storage service 24C disclosed in PCT/US14/51419 is implemented as a client 3 as shown in FIG. 1 herein. Accordingly, the block service 15 as described herein is utilized to provide a protection class instance 20 as an underlying source of blocks for allocation by the block storage service 24C disclosed in PCT/US14/51419.

Figure 22:
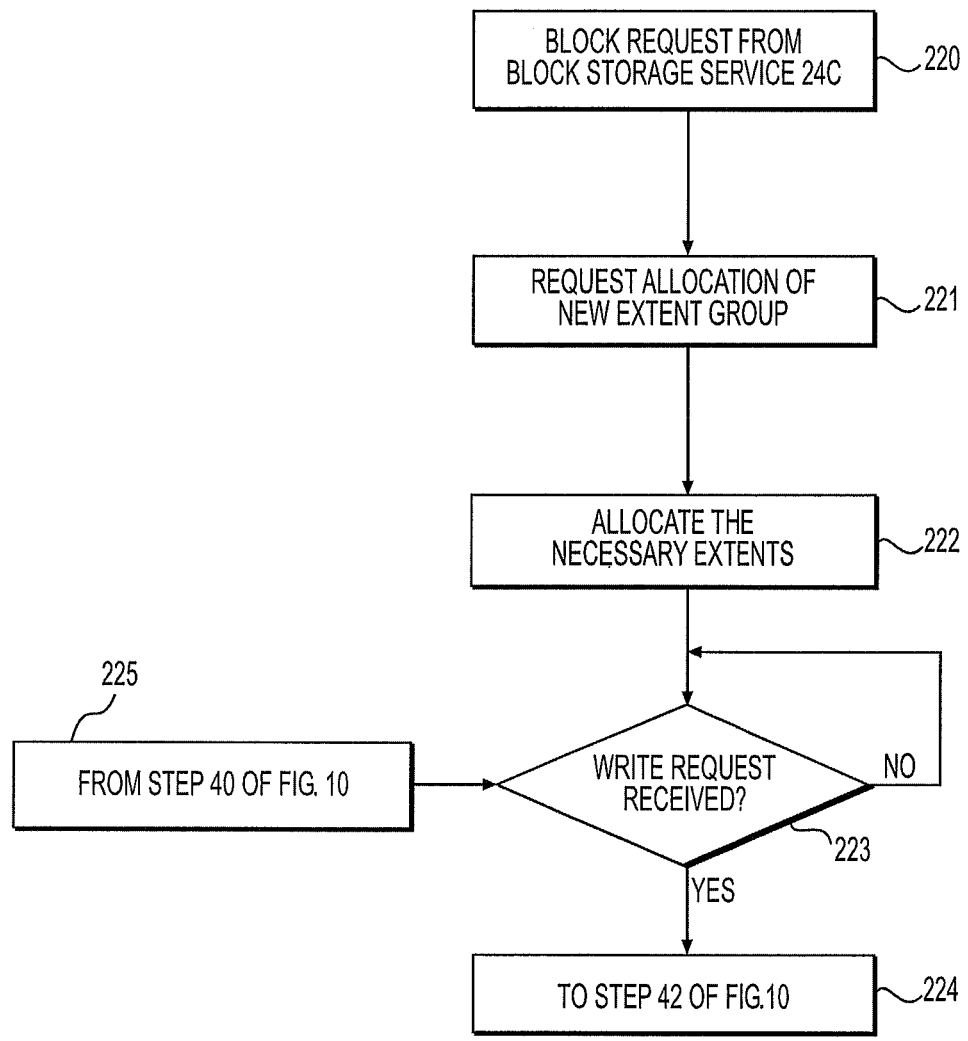
FIG. 22 is a processing flow for allocating block storage space from a protection class instance in accordance with an implementation where a block storage service is provided as a client.

As shown in FIG. 13 of PCT/US14/51419, blocks may be allocated and added to a free table managed by the block storage service 24C. In this example, a protection class 20 serves as the source of the blocks used for addition to the free table in FIG. 13 of PCT/US14/51419. FIG. 22 of the present application shows an implementation of a processing flow to allocate block storage space from a protection class instance which is executed to provide the blocks at step 1304 of PCT/US14/51419.

At step 220, the block storage service 24C requests blocks from the protection class instance 20 provided by the block service 15. The block service 15 of the present application, in turn, requests a new extent group be allocated to the protection class, providing the block storage space to the block storage service 24C, by the extent manager 11B at step 221. Next at step 222, similar to step 44, an extent group which conforms to the requirements of the protection class is allocated thereto. Returning to FIG. 13 of PCT/US14/51419, the block storage service 24C adds the blocks provided by the newly allocated extent group at step 1305. The block storage service 24C may accordingly proceed to handle upper-level write requests as shown in FIG. 5 causing file data to be written to blocks provided by the underlying protection class.

As a result, as shown in FIG. 22, the block service 15 may receive one or more write requests to the block storage space of the underlying protection class as shown at step 223. The processing flow of FIG. 22 may continue at step 224 to step 41 of FIG. 10 which illustrates the write process. The write processing may continue as shown at steps 40 and 225 in FIGS. 10 and 22 until the upper-level write request from the block storage service 24C has completed.

Thus, in some examples, the block service 15 provides a protection class which is utilized by the block storage service 24C as a source of blocks available for allocation according to the disclosure of PCT/US14/51419. While block allocation and write processing are described in this example, the recovery processing and parity journaling described the other examples above may also be incorporated into this example.

While the detailed description provides various example embodiments, as described and as illustrated in the drawings, the disclosure is not limited to the embodiments described and illustrated herein, but can extend to other embodiments, as would be known or as would become known to those skilled in the art. Reference are made herein to particular features, structures, and/or characteristics which are described in connection with at least one embodiment, and the appearances of these phrases in various places in the specification may not necessarily all refer to the same embodiment. Additionally, in the following detailed description, numerous specific details are set forth in order to provide a thorough understanding of the disclosure. However, it will be apparent to one of ordinary skill in the art that these specific details may not all be needed to practice the implementations herein. In other circumstances, well-known structures, materials, circuits, processes and interfaces have not been described in detail, and/or may be illustrated in block diagram form.

Moreover, some portions of the detailed description that follow are presented in terms of flow diagrams of processing flows and symbolic representations of operations within a computer. These flow diagrams of processes, algorithmic descriptions and symbolic representations are the means used by those skilled in the data processing arts to most effectively convey the essence of their innovations to others skilled in the art. In some examples, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is understood that throughout the description, discussions utilizing terms such as "processing", "determining", "checking", "determining", "moving", "calling", "allocating" or the like, can include the actions and processes of a computer system or other information processing device that manipulates and transforms data represented as physical quantities (electronic quantities within the computer system's registers and memories) into other data similarly represented as physical quantities within the computer system's memories, disk drives or registers or other information storage, transmission or display devices.

The implementations herein also relate to apparatuses or systems for performing the operations herein. These may be specially constructed for the required purposes, or it may include one or more general-purpose computers or Servers selectively activated or reconfigured by one or more computer readable media. Such computer-readable storage media have computer executable instructions such as modules stored thereon and generally include, but are not limited to, optical disks, magnetic disks, read-only memories, random access memories, solid state devices and drives, or any other type of media suitable for storing electronic information. The processes, algorithms and displays presented herein are not inherently related to any particular computer or other apparatus. Various general-purpose systems may be used in accordance with the teachings herein, or it may prove convenient to construct a more specialized apparatus to perform desired processes and methods. The structure for a variety of these systems will appear from the description. In addition, the examples herein are not described with reference to any particular programming language. It will be appreciated that a variety of programming languages may be used to implement the teachings of the disclosure as described herein. The instructions of the programming language(s) may be executed by one or more processing devices, e.g., central processing units (CPUs), processors, or controllers. While the following description may tangentially refer to file systems, such as RFS, NFS, etc. as a baseline network file system, which provides file system services over a network to store and retrieve data or files from a storage device, the scope of the disclosure is not limited in this regard.

The systems configurations and processing flows illustrated herein are of purely example embodiments, and implementations herein are not limited to any particular hardware, software or logical configuration. It should be further understood by those skilled in the art that although the foregoing description has been made with respect to particular examples, implementations herein are not limited thereto and various changes and modifications may be made without departing from the spirit of the disclosure and the scope of the appended claims. The computers and storage systems implementing the implementations can also have known I/O devices (e.g., CD and DVD drives, floppy disk drives, hard drives, volatile memory, nonvolatile memory etc.) which can store and read the databases, modules, programs and data structures used to implement the above-described examples. These modules, programs and data structures can be encoded on computer-readable media. For example, the data structures can be stored on computer-readable media independently of one or more computer-readable media on which reside programs to carry out the processing flows described herein. The components of the system can be interconnected by any form or medium of digital data communication network. Examples of communication networks include local area networks, wide area networks, e.g., the Internet, wireless networks, storage area networks, and the like.

In the description, numerous details are set forth for purposes of explanation in order to provide a thorough understanding of the implementations. However, it will be apparent to one skilled in the art that not all of these specific details are required in order to practice the described examples. It is also noted that some implementations herein may be described as processes, which may be depicted as flowcharts, flow diagrams, structure diagrams, or block diagrams. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects may be implemented using circuits and logic devices (hardware), while other aspects may be implemented using instructions stored on a machine-readable medium (software), which if executed by a processor, would cause the processor to perform a method to carry out the implementations herein. Furthermore, some implementations may be performed solely in hardware, whereas other implementations may be performed solely in software. Moreover, the various functions described can be performed in a single unit, or can be spread across a number of components in any number of ways.

Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the implementations, and it is to be understood that the terms used in the following claims should not be construed to limit the claims to the specific embodiments disclosed in the specification. Rather, the scope of the claims is to be construed in accordance with the established doctrines of claim interpretation, along with the full range of equivalents to which such claims are entitled.

The invention claimed is:

1. A storage system comprising:
a plurality of storage devices on which a plurality of storage extents are configured;
a memory configured to store extent group information indicative of a mapping of the plurality of storage extents to a plurality of extent groups allocated to a plurality of protection classes; and
a plurality of processors, where at least one of the processors, when storing write data for a write operation, is configured to:
determine a protection class, in the plurality protection classes, which provides a certain protection level required to store the write data,
determine whether one or more extent groups of the determined protection class have capacity to store the write data, and
in response, at least in part, to determining that the one or more extent groups do not have the capacity to store the write data,
create a new extent group by selecting a plurality of the storage extents from the plurality of the storage devices, where a number of the selected storage extents is set at least in part by the determined protection class,
allocate the new extent group to the determined protection class, and
store the write data for the write operation to the created new extent group.

2. The storage system as recited in claim 1, wherein at least one of the processors is further configured to:
update the extent group information to map the selected storage extents to the new extent group allocated to the determined protection class, and
wherein the extent group information includes a mapping of logical block addresses of each protection class to the storage extents configured on the storage devices.

3. The storage system as recited in claim 1, wherein at least one of the processors is further configured to:
select the storage extents for the new extent group so that at least some of the selected storage extents are configured on separate ones of the plurality of storage devices.

4. The storage system as recited in claim 1, wherein each protection class provides a predetermined protection level and each extent group allocated thereto includes:
a predetermined number of storage extents that store write data corresponding to the predetermined protection level, and
a predetermined number of storage extents that store protection information for the write data stored in the respective extent group and corresponding to the predetermined protection level.

5. The storage system as recited in claim 4, wherein at least one of the processors is further configured to:
compute the protection information in the new extent group from the write data for the write operation to be stored in the new extent group, and
store the write data for the write operation and the protection information to the selected storage extents of the new extent group on a stripe basis,
wherein the protection information is parity or other algebraic redundancy code of the write data, and
wherein the protection class is mirrored on the storage devices.

6. The storage system as recited in claim 4, wherein at least one of the processors is further configured to:
compute the protection information in the new extent group from the write data for the write operation to be stored in the new extent group, and
store the write data for the write operation and the protection information to the selected storage extents of the new extent group on a stripe basis,
wherein the protection information is Reed-Solomon erasure coding.

7. The storage system as recited in claim 4, wherein, in response, at least in part to a failure of one or more of the storage devices, at least one of the processors is further configured to:
set a priority order in which write data stored in the storage extents configured on the one or more of the failed storage devices are to be repaired, the priority order based on the respective number of storage extents that store the protection information for each of the extent groups configured on the one or more of the failed storage devices, and
repair the write data stored in the storage extents configured on the one or more of the failed storage devices according to the priority order by referring to the protection information in the extent groups to which each of the extents configured on the one or more of the failed storage devices are mapped in the extent group information.

8. The storage system as recited in claim 4, wherein, in response, at least in part, to the extent group information stored in the memory being unavailable, at least one of the processors is further configured to:
reconstruct the extent group information by referring to header information stored in each of the storage extents configured on each of the plurality of storage devices,
wherein, for each of the storage extents in one of the extent groups allocated to one of the protection classes, the header information specifies the respective one of the extent groups, the respective one of the protection classes, and a logical location of the respective storage extent within the respective one of the extent groups.

9. The storage system as recited in claim 4, wherein, in response, at least in part, to determining that the extent groups of the determined protection class have the capacity to store the write data, at least one of the processors is further configured to:
compute protection information for the write data,
compute a parity journal for the write data for the write operation from existing write data which is to be modified by the write data and existing protection information stored in the one or more extent groups on a stripe basis,
store the parity journal in a predetermined journal segment of a number of the storage devices corresponding to the determined protection class to which the one or more extent groups are allocated, and
store the write data for the write operation and protection information of the write data for the write operation to the one or more extent groups on a stripe basis,
wherein the parity journal is stored on the storage devices other than the storage devices which store the existing data which is not modified by the write data.

10. The storage system as recited in claim 9, wherein, if at least one of the processors fails and the write data and parity information are not completely stored, another of the processors is further configured to:
determine whether the write data for the write operation and the protection information of the write data for the write operation correspond to the parity journal on a block basis, and
repair, using the parity journal, any blocks in the write data for the write operation and the protection information of the write data for the write operation which are determined to not correspond to the parity journal.

11. The storage system as recited in claim 4, wherein at least one of the processors is further configured to:
compute a parity journal for the write data on a stripe basis,
store the parity journal in a predetermined journal segment of a number of the storage devices corresponding to the determined protection class to which the new extent group is allocated, and
store the write data for the write operation and protection information of the write data for the write operation on a stripe basis to the new extent group.

12. One or more non-transitory computer-readable media maintaining instructions that, when executed by one or more processors, program the one or more processors to:
receive write data for a write operation in a system including a plurality of storage devices on which a plurality of storage extents are configured;
determine, based at least in part on extent group information, a protection class that provides a desired protection level for storing the write data, wherein the extent group information indicates an association between the plurality of storage extents and a plurality of extent groups allocated to a plurality of protection classes;
in response, at least in part, to determining that the one or more extent groups of the determined protection class do not have the capacity to store the write data, create a new extent group by selecting a plurality of the storage extents from the plurality of the storage devices, where a number of the selected storage extents is set at least in part by the determined protection class;
allocate the new extent group to the determined protection class, and
store the write data to the new extent group.

13. The one or more non-transitory computer-readable media as recited in claim 12, wherein the one or more processors are further programmed to determine the protection classes so that each protection class provides a predetermined protection level and each extent group allocated thereto includes:
a predetermined number of storage extents for storing write data corresponding to the predetermined protection level, and
a predetermined number of storage extents for storing protection information for the write data stored in the respective extent group and corresponding to the predetermined protection level.

14. The one or more non-transitory computer-readable media as recited in claim 13, wherein, in response, at least in part, to a failure of one of the storage devices, the one or more processors are further programmed to:
determine a priority order in which the write data stored in the storage extents configured on a failed storage device are to be repaired, the priority order based on the respective number of storage extents that store the protection information for each of the extent groups configured on the failed storage device; and
repair the write data stored in the storage extent configured on the failed storage device according to the priority order by referring to the protection information in the extent groups to which each of the extents configured on the failed storage device is associated in the extent group information.

15. The one or more non-transitory computer-readable media as recited in claim 13, wherein the one or more processors are further programmed to:
   determine the protection information in the new extent group from the write data for the write operation stored in the new extent group; and
   store the write data for the write operation and the protection information to the selected storage extents of the new extent group on a stripe basis,
   wherein the protection information is parity or other algebraic redundancy of the write data, and
   wherein the protection class is mirrored on the storage devices.

16. A method comprising:
   receiving write data for a write operation;
   determining, by one or more processors, based at least in part on extent group information, a protection class, from among a plurality protection classes, that provides a certain protection level for storing the write data for the write operation, wherein the extent group information indicates an association between a plurality of storage extents and a plurality of extent groups allocated to a plurality of protection classes;
   in response, at least in part, to determining that one or more extent groups of the determined protection class do not have a capacity to store the write data, creating a new extent group by selecting a plurality of storage extents from a plurality of storage devices, where a number of the selected storage extents is set at least in part by the determined protection class;
   allocating the new extent group to the determined protection class; and
   storing the write data for the write operation to the new extent group.

17. The method as recited in claim 16, further comprising:
   updating the extent group information to associate the selected storage extents to the new extent group allocated to the determined protection class, and
   wherein the extent group information includes a mapping of logical block addresses of each protection class to the storage extents configured on the plurality of storage devices.

18. The method as recited in claim 16, further comprising:
   selecting the storage extents for the new extent group so that at least some of the selected storage extents are configured on separate ones of the plurality of storage devices.

19. The method as recited in claim 16, wherein each protection class provides a predetermined protection level and each extent group allocated thereto includes:
   a predetermined number of storage extents that store write data corresponding to the predetermined protection level, and
   a predetermined number of storage extents that store protection information for the write data stored in the respective extent group and corresponding to the predetermined protection level.

* * * * *